US009604355B2

(12) United States Patent
Tully

(10) Patent No.: US 9,604,355 B2
(45) Date of Patent: Mar. 28, 2017

(54) HANDLE FOR A HYDRAULICALLY DRIVEN TOOL WITH HEAT TRANSMISSION REDUCING PROPERTIES

(71) Applicant: Textron Innovations Inc., Providence, RI (US)

(72) Inventor: Gerald Jonathan Tully, Elgin, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 546 days.

(21) Appl. No.: 13/625,974

(22) Filed: Sep. 25, 2012

(65) Prior Publication Data

US 2013/0081838 A1 Apr. 4, 2013

Related U.S. Application Data

(60) Provisional application No. 61/541,674, filed on Sep. 30, 2011.

(51) Int. Cl.

| | |
|---|---|
| ***B23B 45/04*** | (2006.01) |
| ***B27C 3/08*** | (2006.01) |
| ***B25F 5/02*** | (2006.01) |
| ***B25F 5/00*** | (2006.01) |
| *B25B 23/145* | (2006.01) |

(52) U.S. Cl.

CPC ................ *B25F 5/02* (2013.01); *B25F 5/005* (2013.01); *B25F 5/008* (2013.01); *B25B 23/1453* (2013.01); *Y10T 137/2622* (2015.04)

(58) Field of Classification Search

CPC ............. B25F 5/00; B25F 5/005; B25F 5/028

USPC ................................. 173/168, 170, 177, 200

See application file for complete search history.

(56) References Cited

U.S. PATENT DOCUMENTS 3,762,453 A * 10/1973 Merrow ................... B25G 1/10 264/271.1
3,812,552 A * 5/1974 Blackmon ............... A47L 11/34 15/321
3,889,693 A * 6/1975 Tanaka ................... A45D 20/10 132/272
3,922,782 A * 12/1975 Lind ...................... A01G 3/033 30/228
4,043,318 A * 8/1977 Pei ........................... F24J 2/055 126/643
4,094,365 A * 6/1978 Wanner ................... B06B 1/183 173/105
4,294,270 A * 10/1981 Cochran ................ A45D 24/22 132/112
4,355,905 A * 10/1982 St. Louis ................ B29C 47/84 277/354

(Continued)

FOREIGN PATENT DOCUMENTS

EP 0077071 A1 * 4/1983 ....... B05C 17/00523
FR 2711350 A1 * 4/1995 ........... B62K 21/125

*Primary Examiner* — Robert Long

(74) *Attorney, Agent, or Firm* — Klintworth & Rozenblat IP LLC

(57) ABSTRACT

A handle for a hydraulically driven tool is provided reduces the amount of heat transmitted to the user of the tool as a result of the high temperature fluid flowing through the inner body of the handle. The inner body is formed of a heat transmissive material which has at least one channel through which the fluid flows. The handle has a number of properties which reduces heat transmission to the user, including standoffs, ribs and fastener receiving extensions.

31 Claims, 19 Drawing Sheets

(56) References Cited

U.S. PATENT DOCUMENTS 4,732,221 A * 3/1988 Dudek .................. B25D 17/04 173/170
4,749,049 A * 6/1988 Greppmair ................. 173/162.2
4,798,934 A * 1/1989 Boyer .................. B23K 3/0346 16/431
4,837,892 A * 6/1989 Lo .................................. 16/431
4,858,813 A * 8/1989 Wingert .................... B25F 5/02 227/131
4,936,027 A * 6/1990 Tsuji ........................ A45D 1/04 132/228
4,941,232 A * 7/1990 Decker ................... B25F 5/006 16/421
5,074,023 A * 12/1991 Decker ................... B25F 5/006 16/DIG. 12
5,097,566 A * 3/1992 Decker ................... B25F 5/006 16/421
5,294,284 A * 3/1994 Papulski ................. D06F 75/30 156/574
5,297,733 A * 3/1994 Burks ..................... B05B 7/205 239/346
5,375,666 A * 12/1994 Pettet et al. ............... 173/162.1
5,469,982 A * 11/1995 Gordecki et al. ............ 220/4.02
D384,562 S 10/1997 Sung
5,692,574 A * 12/1997 Terada ....................... 173/162.2
5,701,681 A * 12/1997 Wonka ................... A45D 20/12 34/96
5,740,586 A * 4/1998 Gomas ..................... B25G 1/10 16/430
5,944,263 A * 8/1999 Lucco ................... B05B 15/066 173/171
5,960,996 A * 10/1999 Hsu ..................... B05C 17/0055 126/401
6,110,045 A * 8/2000 Schoeps .................. B25B 21/02 173/93.5
6,179,063 B1 * 1/2001 Borries ................... B25B 21/02 173/177
6,313,451 B1 * 11/2001 Vidmar ................ H05B 6/6494 219/730
6,338,389 B1 1/2002 Chang
6,536,536 B1 * 3/2003 Gass et al. ........................ 173/2
6,543,549 B1 * 4/2003 Riedl ...................... B25B 21/00 173/171
6,629,331 B2 * 10/2003 Panfili ..................... A47L 13/08 15/143.1
6,641,634 B2 * 11/2003 Reich et al. ................. 55/385.1
D489,240 S 5/2004 Bartfeld et al.
D496,243 S 9/2004 Huang
D497,787 S 11/2004 Liao
D507,951 S 8/2005 McMenemy et al.
D513,690 S 1/2006 Etter et al.
6,983,550 B1 * 1/2006 Lin ......................... F23D 14/18 34/96
6,994,354 B2 * 2/2006 Sakata .......................... 277/598
7,065,899 B2 * 6/2006 Lin ....................... F24H 3/0488 34/97
D534,047 S 12/2006 Chi
7,191,849 B2 3/2007 Chen
D567,615 S 4/2008 Taniguchi et al.
D572,991 S 7/2008 Chen
D605,490 S 12/2009 Aglassinger
7,827,950 B2 * 11/2010 Hu et al. .................... 123/90.38
D650,652 S 12/2011 Aglassinger
8,616,098 B1 * 12/2013 Rosow ................... B25G 1/102 16/430
9,044,850 B2 * 6/2015 Kokinelis ................. B25F 5/02
2002/0040229 A1 * 4/2002 Norman ........... A61B 17/32002 606/180
2003/0077105 A1 * 4/2003 Hall ...................... A47L 13/257 401/140
2003/0135965 A1 * 7/2003 Wales ............................. 24/559
2004/0013486 A1 * 1/2004 Cooper ..................... 408/241 R
2004/0139572 A1 * 7/2004 Kisela ....................... A47L 5/24 15/320
2004/0216758 A1 * 11/2004 Rascoe .................... A45D 2/00 132/200
2004/0226969 A1 * 11/2004 Shew ........................ F16N 3/12 222/333
2005/0148276 A1 * 7/2005 LaFata ................... A63H 31/08 446/18
2005/0284649 A1 * 12/2005 Sabates .................... A22B 3/02 173/212
2006/0213017 A1 * 9/2006 Bele ........................ A47L 13/22 15/143.1
2008/0224421 A1 * 9/2008 Niblett et al. ................ 277/638
2008/0245452 A1 * 10/2008 Law et al. .................... 150/154
2010/0120350 A1 * 5/2010 Pucciani ............... F26B 21/004 454/188
2010/0302773 A1 * 12/2010 Kokoski ............... F21L 14/023 362/231
2011/0120740 A1 * 5/2011 Moreno et al. ............ 173/162.2
2011/0186461 A1 * 8/2011 Poitevin ........................ 206/475
2011/0220632 A1 * 9/2011 Moon ................. A47J 37/0623 219/392
2012/0234572 A1 * 9/2012 Kratzig et al. ................ 173/213
2013/0081839 A1 * 4/2013 Tully ............................ 173/177
2013/0180692 A1 * 7/2013 Gomez ................ B23K 37/006 165/135
2013/0180693 A1 * 7/2013 Gomez ................ B23K 37/006 165/135
2015/0239134 A1 * 8/2015 Duey ...................... B26B 1/046 30/159
2015/0280517 A1 * 10/2015 Ekstrom ................ H01H 21/12 173/170

* cited by examiner

HANDLE FOR A HYDRAULICALLY DRIVEN TOOL WITH HEAT TRANSMISSION REDUCING PROPERTIES

This application claims the domestic benefit of U.S. provisional application Ser. No. 61/541,674, filed on Sep. 30, 2011, which disclosure is herein incorporated by reference in its entirety.

FIELD OF THE INVENTION

The present invention particularly relates to a handle for a hydraulically driven tool, such as a wrench or a drill, which reduces the amount of heat transmitted to the user of the tool.

BACKGROUND OF THE INVENTION

Existing hydraulic tools, such as hydraulic wrenches, generate heat as result of the use of high temperature hydraulic fluid passing through the tool. The user grips a grip which surrounds a metal valve body through which the high temperature hydraulic fluid passes. It is desirable to prevent the transfer of this heat to the user's hand. The prior art insulates the metal valve body with a PVC-based dip, which tends to be inadequate to prevent the passage of heat generated by the high temperature hydraulic fluid. In addition, the PVC-based dip is not very durable and is not easy to replace if the tool becomes damaged.

Prior art tools have controlled flow in a circuit, and thus output motor torque in the circuit. A control for setting the torque to two discrete settings has been used in the prior art. This presents a disadvantage in that only two settings are provided. Other prior art tools have used a pressure compensated flow control mechanism with an infinite adjustment setting. Pressure compensated flow control mechanisms are costly to manufacture.

A hydraulically driven tool is provided herein which provides improvements to existing tools and which overcomes the disadvantages presented by the prior art. Other features and advantages will become apparent upon a reading of the attached specification, in combination with a study of the drawings.

SUMMARY OF THE INVENTION

A handle for a hydraulically driven tool, such as a wrench or a drill, which reduces the amount of heat transmitted to the user of the tool is disclosed. The tool has a body formed of a heat transmissive material which has at least one channel through which a high temperature fluid flows. Heat is generated as a result of the fluid. The body includes a plurality of fastener receiving passageways therethrough; each passageway has a countersink provided at each end thereof. The handle is non-conductive and generally surrounds the body. The interior surface of the handle has a plurality of spaced apart standoffs extending therefrom. The standoffs contact the body and an air gap is formed between the interior surface and the body at locations where standoffs are not provided. This provides for a minimal amount of surface contact between the metal valve body and the non-conductive grip housing which reduces the amount of conduction from the heat transmissive body to the non-conductive handle, and thus to the user's hand which surrounds this area. In addition, the air gap allows air flow between the body and the handle for convection cooling of the body. The interior surface has a plurality of fastener receiving extensions, each having an aperture therethrough, which align with the respective passageways. The fastener receiving extensions seat within the countersinks and the fastener receiving extensions are smaller than the countersinks. As a result, the fastener receiving extensions do not contact the body to aid in minimizing the amount of heat transmitted to the handle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
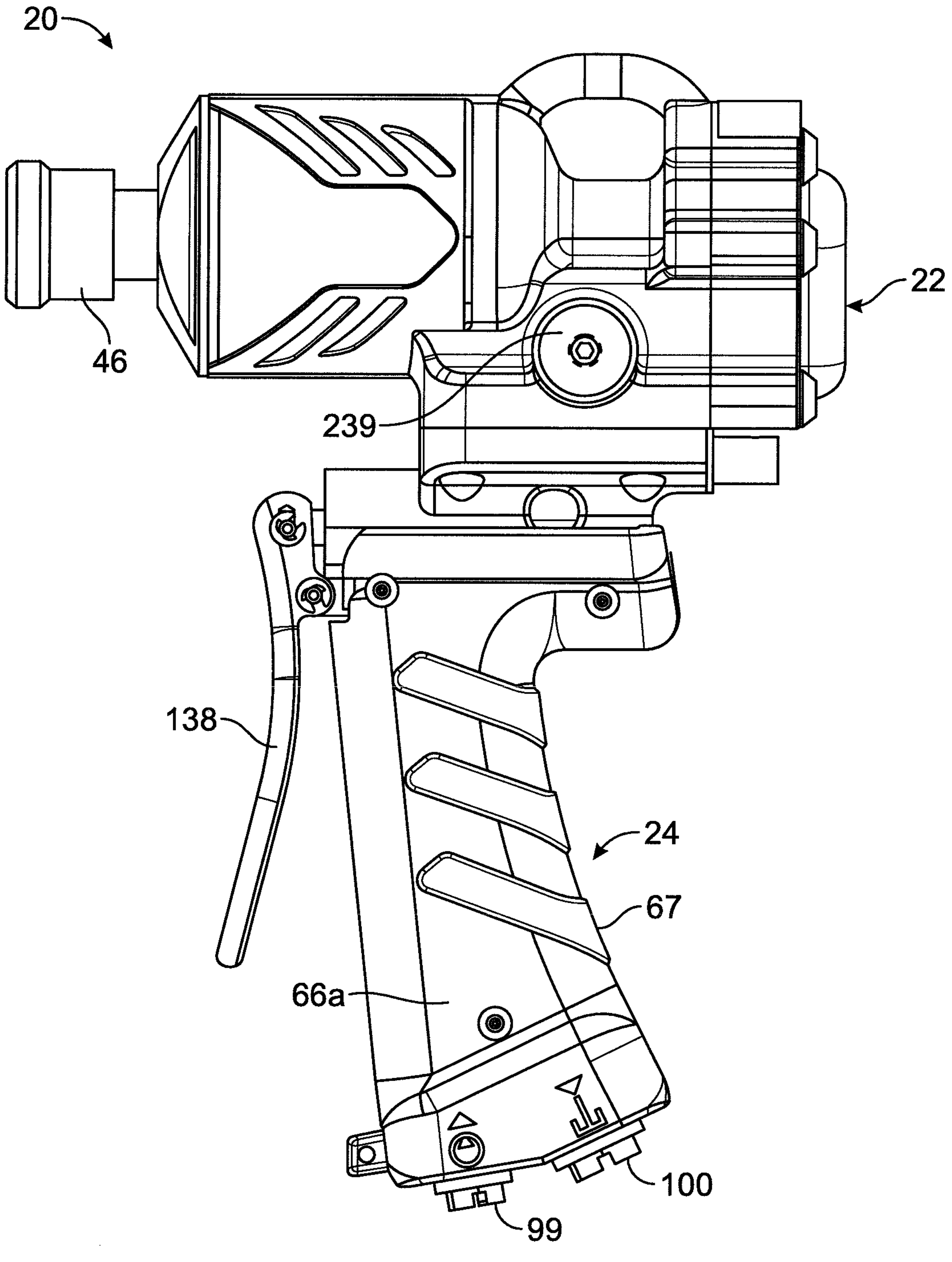
FIG. 1 is a side elevational view of a tool which incorporates the features of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A fluid-operated tool 20, such as a hydraulic wrench or drill, includes a fluid control system which provides for variable limitation of power output. The fluid control system provides multiple flow paths to provide for, among other things, selectable diversion of a portion of flow to a work unit assembly 22 of the tool 20, and reversing the direction of the work unit assembly 22. The tool 20 may be used by professional linemen who work outdoors under a variety of conditions, including blistering heat and intense cold.

Figure 5:
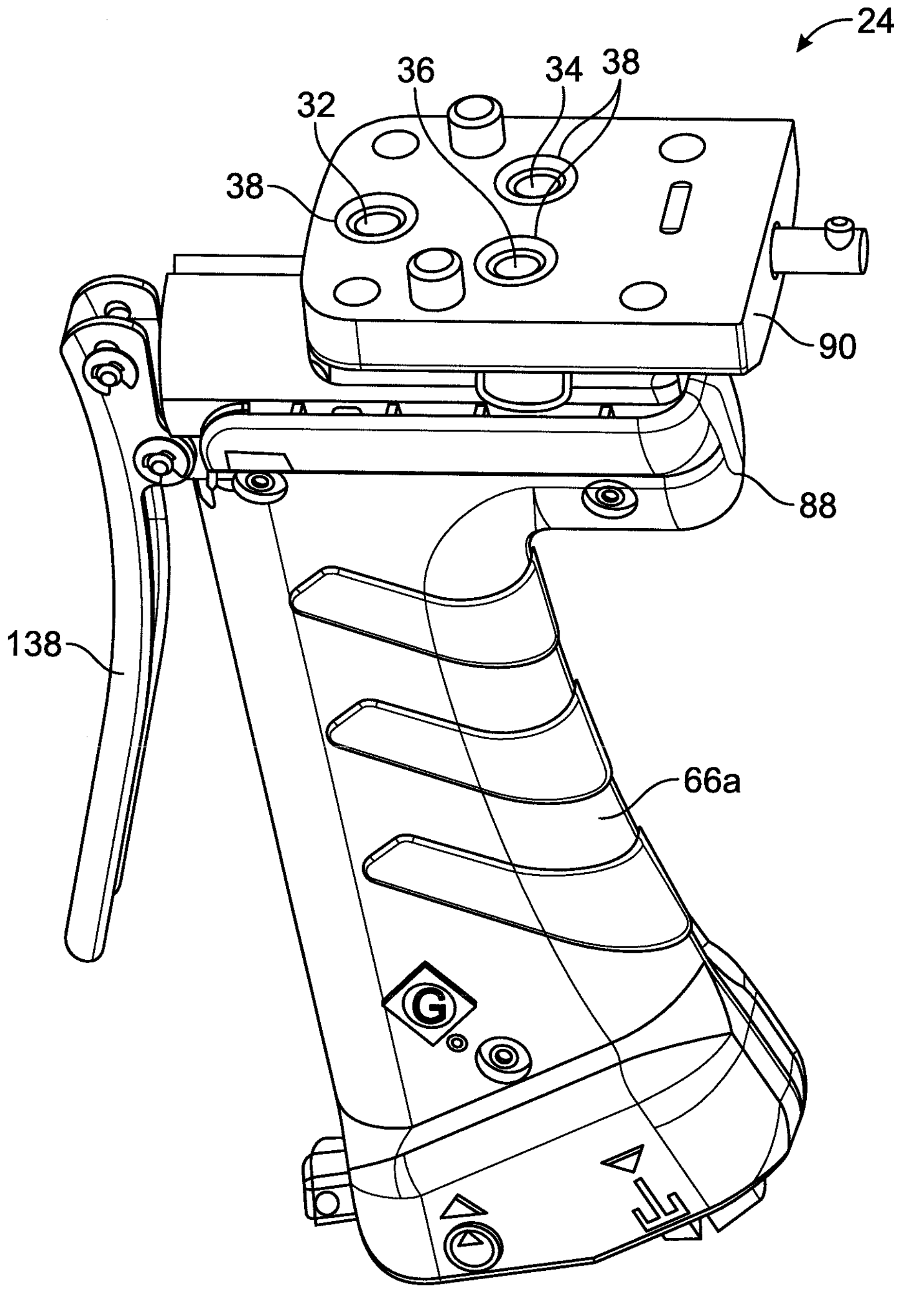
FIG. 5 is a perspective view of a grip assembly which forms a portion of the tool.
Figure 17:
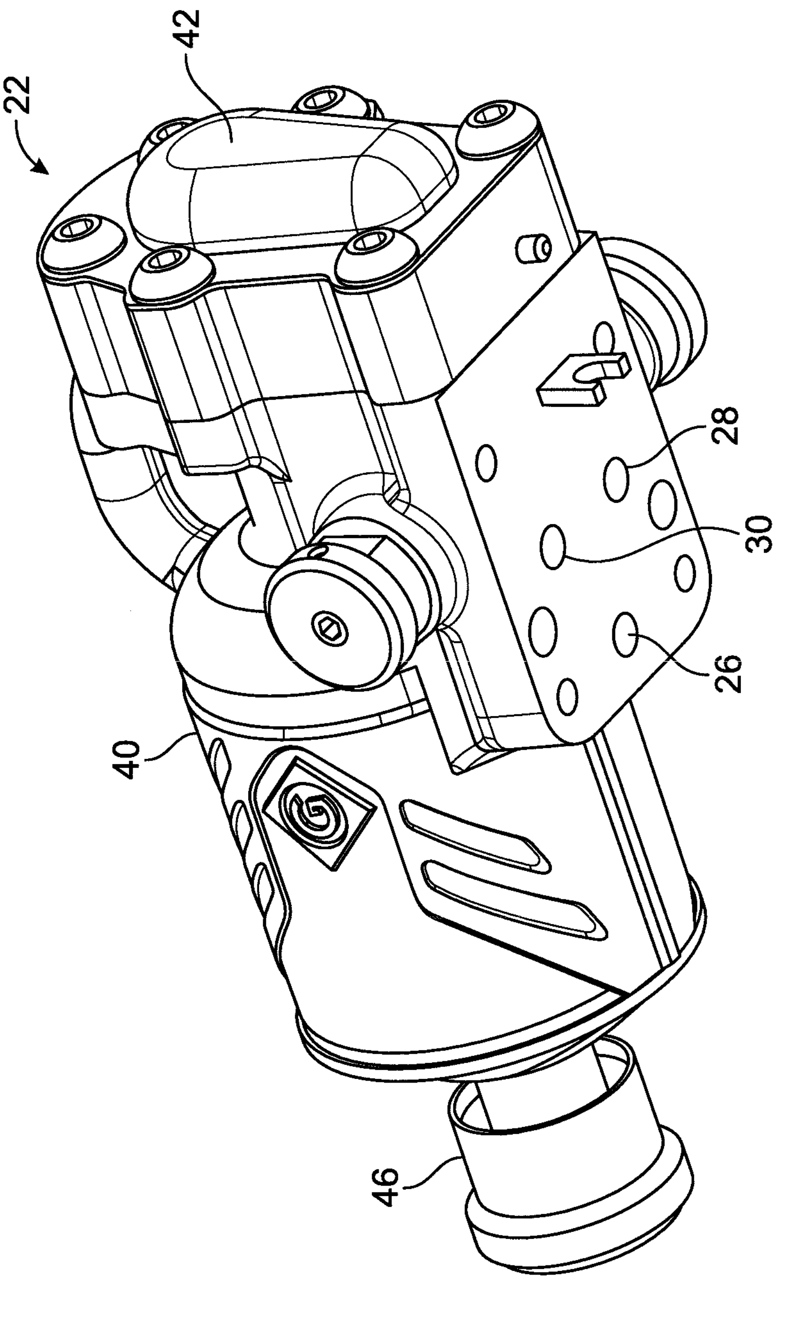
FIG. 17 is a perspective view of a work unit assembly which forms a portion of the tool.

The tool 20 is a two piece design formed of the work unit assembly 22 and a grip assembly 24. The work unit assembly 22 has a series of ports 26, 28, 30, see FIG. 17, which align with ports 32, 34, 36, see FIG. 5, in the grip assembly 24. O-rings 38 seal the connections between the ports 26/32, 28/34, 30/36.

Figure 19:
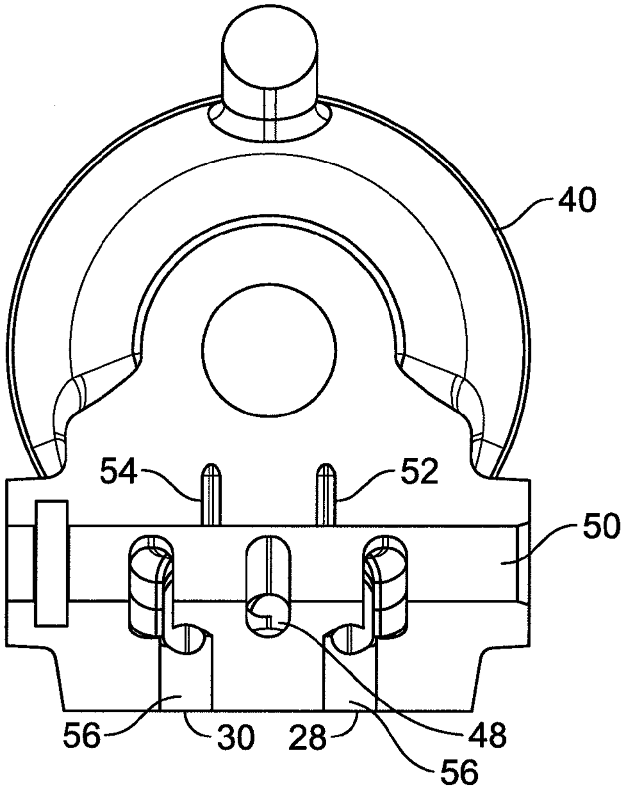
Figure 20:
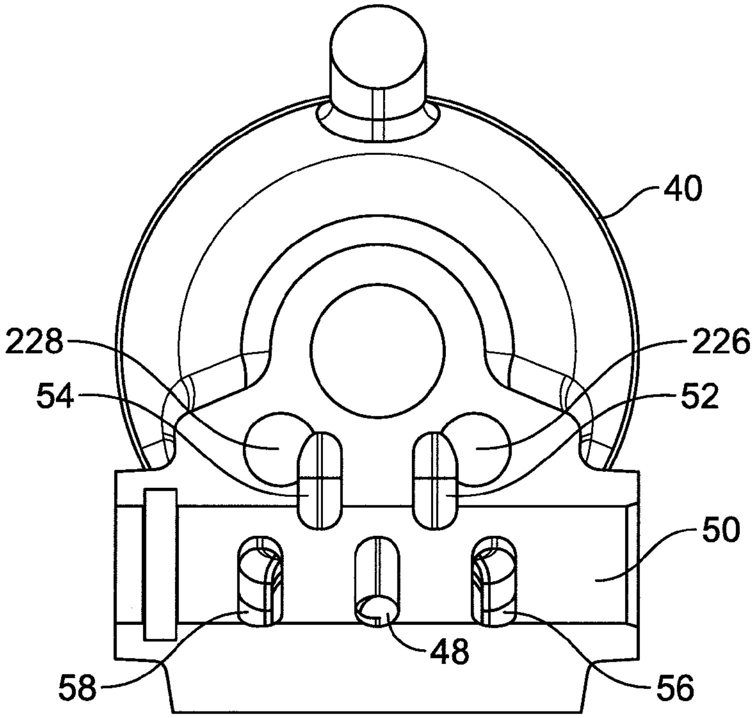
Figure 21:
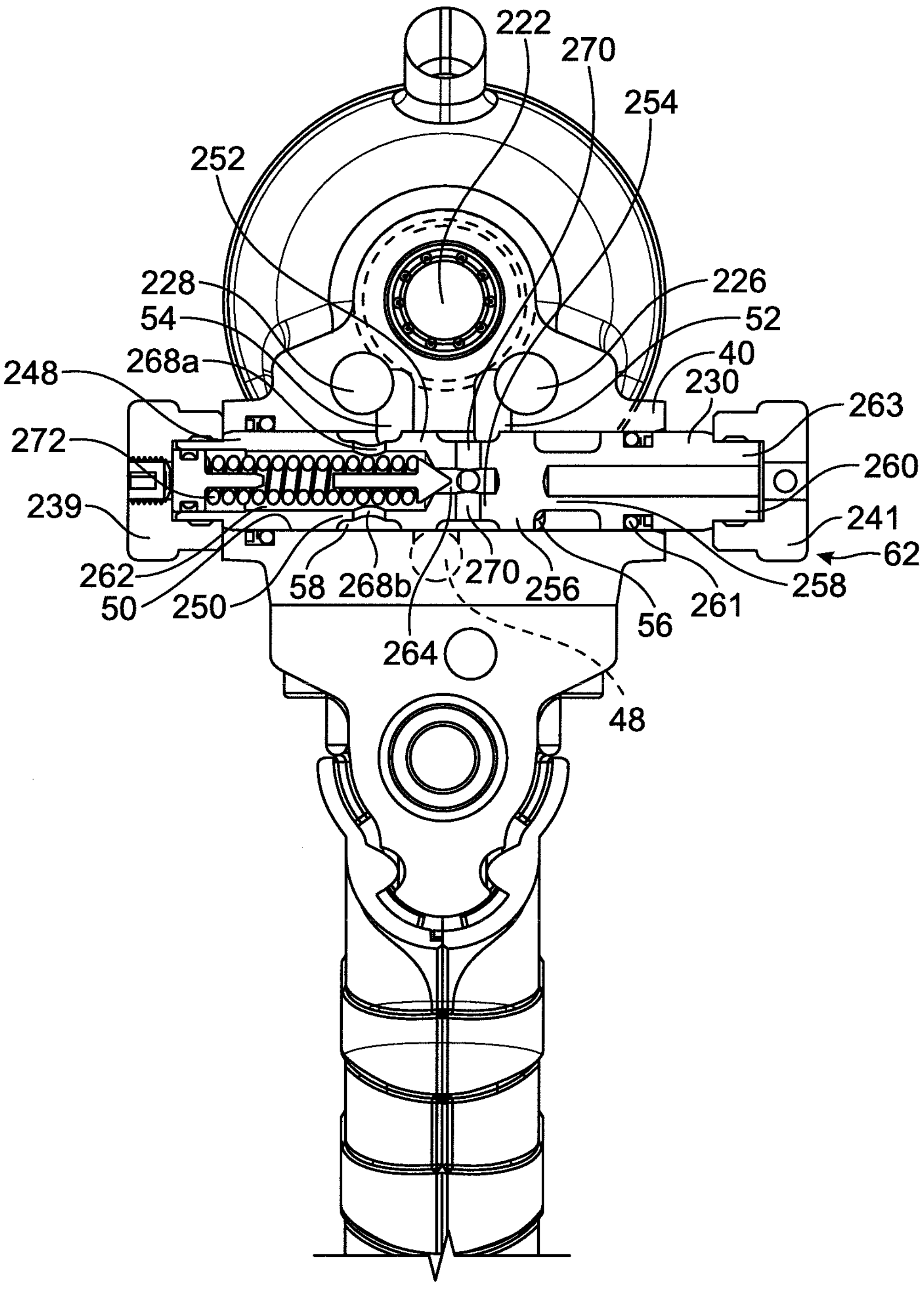

The work unit assembly 22 includes an impact mechanism housing 40, a motor housing 42 attached to the impact mechanism housing 40, a gear motor 44 mounted in the motor housing 42, and a chuck 46 attached to the gear motor 44 by a rotary impact mechanism 47. A bit or other tool (not shown) is mounted to the chuck 46. A plurality of channels 48, 50, 52, 54, 56, 58, see FIGS. 19-21, are provided in the impact mechanism housing 40 to supply the gear motor 44 with hydraulic fluid as discussed in further detail herein. A motor reversing spool assembly 62, FIGS. 21-24, is mounted within channel 50 as discussed herein.

As shown in FIGS. 1-4, the grip assembly 24 includes an inner valve body 64, an outer grip housing 66*a*, 66*b*, generally surrounding the inner valve body 64, a trigger spool assembly 68 and a bypass spool assembly 70. A plurality of channels 72, 74, 76, 78, 80*a*/80*b*, 82, 84 are provided in the inner valve body 64 as discussed in further detail herein. The grip assembly 24 is attached to a supply (not shown) which provides hydraulic fluid to the tool 20.

The inner valve body 64 is formed of heat transmissive material, such as metal, preferably sand cast aluminum. The outer grip housing 66*a*, 66*b*, which the user grips with his/her hand, is formed of a non-conductive material, preferably nylon, and includes first and second halves 66*a*, 66*b*.

Figure 6:
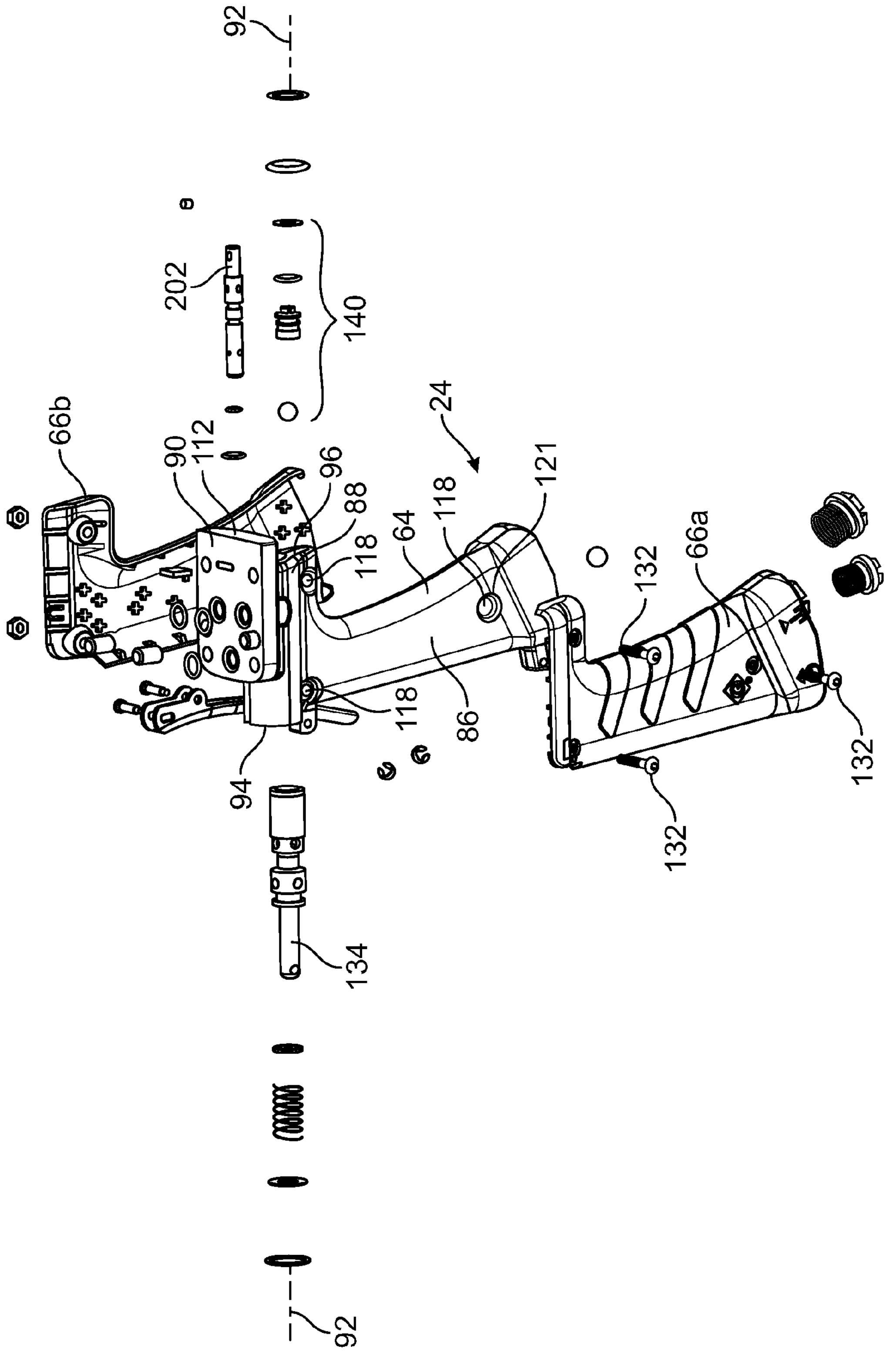
FIG. 6 is an exploded perspective view of the grip assembly.

As shown in FIG. 6, the inner valve body 64 is formed of an elongated portion 86 which has a trigger spool platform 88 formed at the top end thereof, and a bypass valve platform 90 extending from the upper end of the trigger spool platform 88. An axis 92 is defined through the centerline of the trigger spool platform 88 and extends from a front end 94 to a rear end 96 of the trigger spool platform 88.

Figure 2:
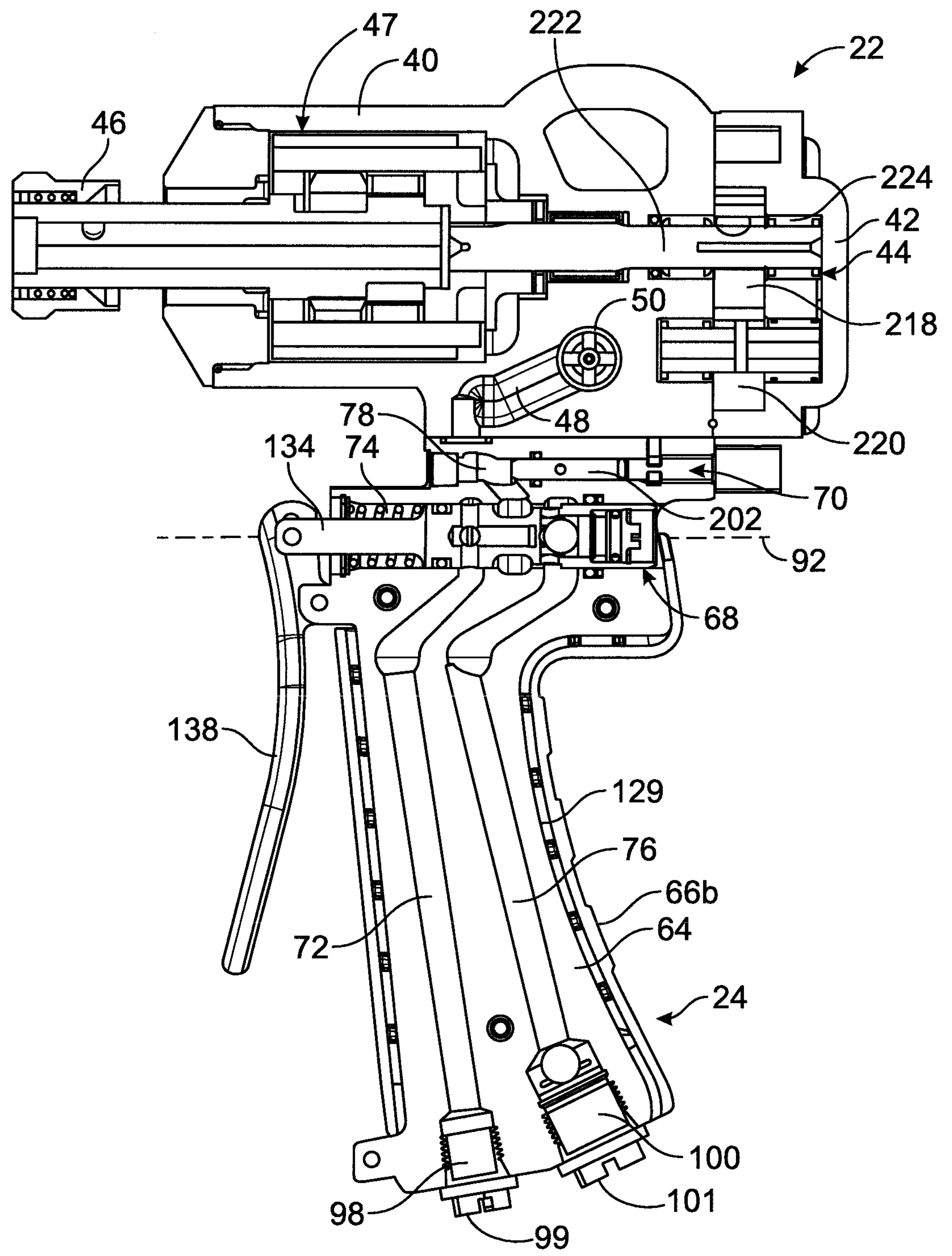
FIG. 2 is a cross-sectional view of the tool.

As shown in FIG. 2, a pressure/pump port 98 and a return/tank port 100 are provided in the bottom end of the inner valve body 64. An inlet channel 72 extends from the pressure/pump port 98 to a trigger spool channel 74 in which the trigger spool assembly 68 is mounted to provide for the flow of hydraulic fluid from the supply to the trigger spool channel 74. An outlet channel 76 extends from the trigger spool channel 74 to the return/tank port 100 to provide for the flow of hydraulic fluid from the trigger spool channel 74 to the supply. The tool 20 is typically used in utility applications and is connected to a hydraulic power unit or auxiliary circuit in a boom truck or tractor via the ports 98, 100. When the ports 98, 100 are not connected to the supply, suitable caps 99, 101 cover the ports 98, 100.

Figure 9:
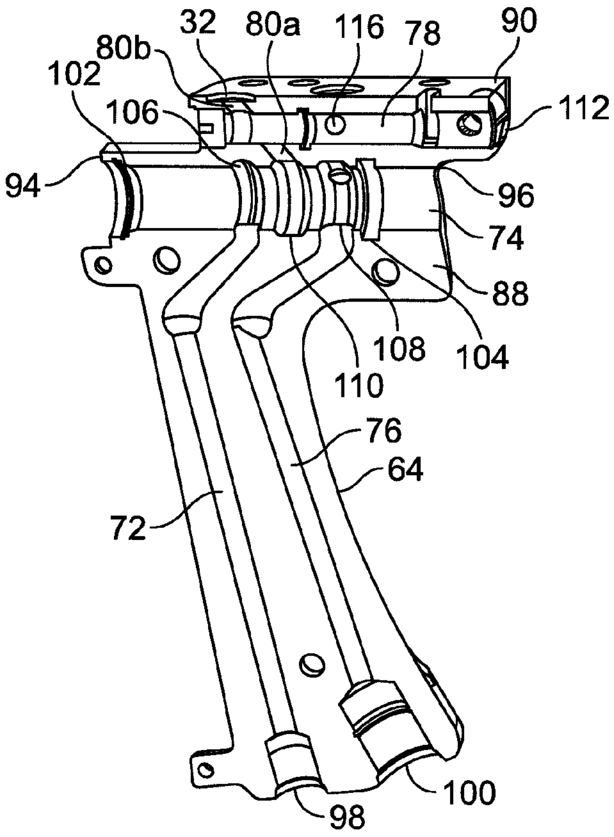
FIG. 9 is a cross-sectional, perspective view of an inner body of the grip assembly.
Figure 10:
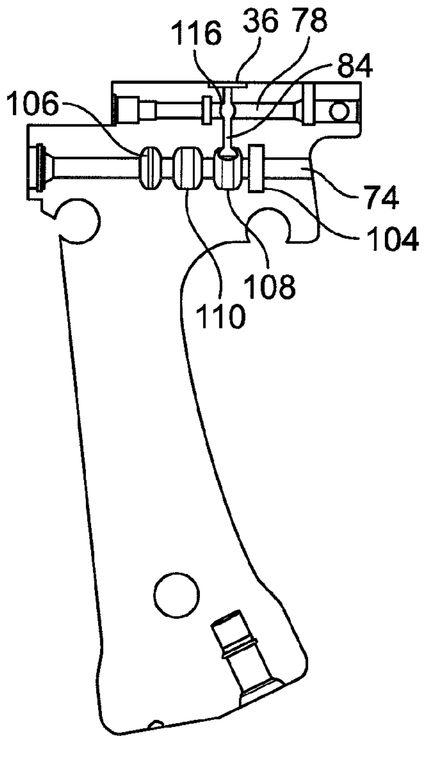
FIG. 10 is a side elevational view of the portion of the inner body.

The trigger spool channel 74 extends along the axis 92 through the trigger spool platform 88. The trigger spool channel 74 is generally cylindrical and extends from the front end 94 of the trigger spool platform 88 to the rear end 96 of the trigger spool platform 88. A C-clip receiving groove 102, FIG. 9, is provided in the wall forming the trigger spool channel 74 proximate to the front end 94. An enlarged O-ring receiving groove 104 is provided in the wall forming the trigger spool channel 74 proximate to the rear end 94. The wall of the trigger spool channel 74 has an enlarged fluid chamber 106 provided at the junction between the trigger spool channel 74 and the inlet channel 72; an enlarged fluid chamber 108 provided at the junction between the trigger spool channel 74 and the outlet channel 76; and an enlarged fluid chamber 110 provided between and spaced from the enlarged fluid chamber 106 and the enlarged fluid chamber 108.

A bypass spool channel 78 extends parallel to the axis 92 through the bypass spool platform 90. The bypass spool channel 78 is generally cylindrical and extends from a rear end 112 of the bypass spool platform 90 forwardly a predetermined distance.

A transfer supply channel 80*a*/80*b* has a first portion 80*a* which connects the enlarged fluid chamber 110 of the trigger spool channel 74 to the bypass spool channel 78 and a second portion 80*b* which connects the bypass spool channel 78 to the outlet port 32 in the upper end of the grip assembly 24. The outlet port 32 supplies fluid to the work unit assembly 22 of the tool 20.

Figure 4:
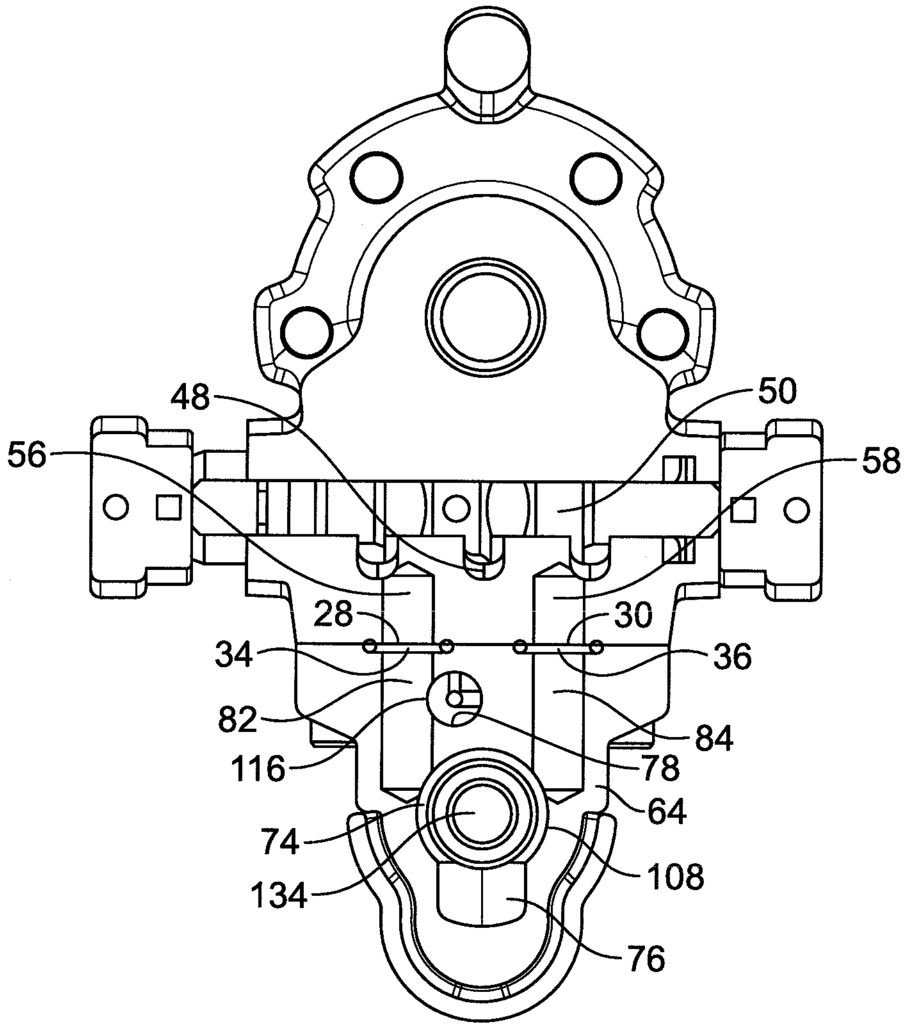
FIG. 4 is an alternate cross-sectional view of the tool.

A return transfer channel 82 connects port 34 to the enlarged fluid chamber 108 of the trigger spool channel 74 (see FIG. 4); return transfer channel 84 connects port 36 to the enlarged fluid chamber 108 of the trigger spool channel 74 (see FIG. 4). Ports 34, 36 receive fluid from the work unit assembly 22 as described herein. The bypass spool channel 78 is connected to the return transfer channel 82 at port 116.

As shown in FIG. 6, the inner valve body 64 has a pair of spaced apart fastener receiving passageways 118 extending through the trigger spool platform 88, and another fastener receiving passageway 118 extending through the elongated portion 86 proximate to the bottom thereof. A countersink 121 is provided in each side of the inner valve body 64 at each end of the respective fastener receiving passageway 118.

Figure 7:
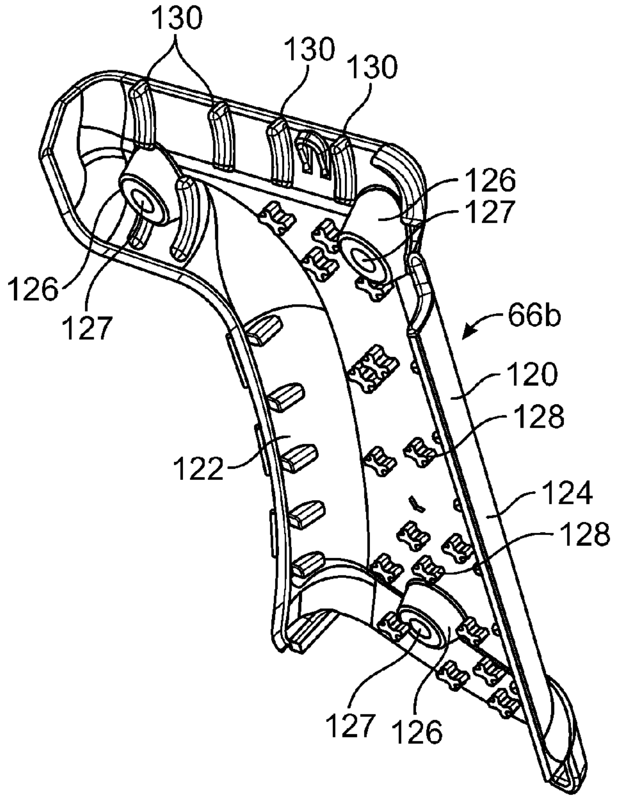
FIG. 7 is a perspective view of a portion of a handle of the grip assembly.
Figure 8:
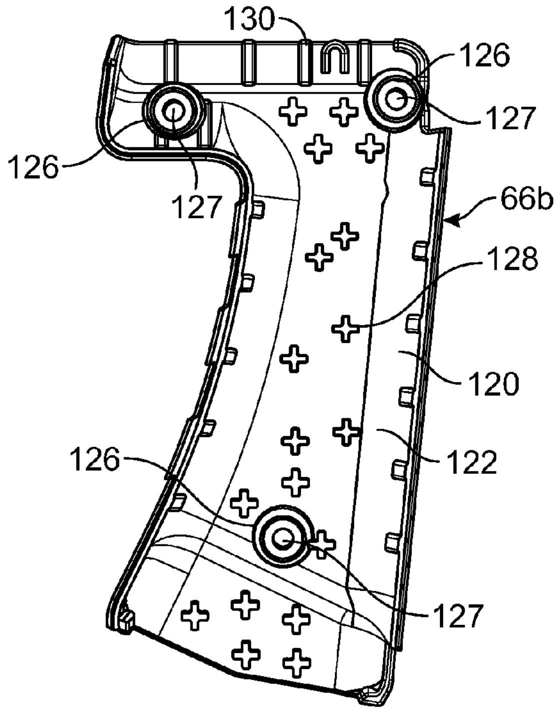
FIG. 8 is a side elevational view of the portion of the handle.

The first and second halves 66*a*, 66*b* of the grip housing are the mirror image of each other. The halves 66*a*, 66*b* are designed to minimize the amount of heat transfer to the user of the tool 20 which results from the use of high temperature hydraulic fluid passing through the tool 20. Halve 66*b* is shown in FIGS. 7 and 8. Each half 66*a*, 66*b* has a wall 120 which mirrors the shape of half of the inner valve body 64. Each wall 120 has an interior surface 122 which faces the inner valve body 64 and an exterior surface 124 which the user grasps with his/her hand. First, second and third fastener receiving extensions 126 extend from the interior surfaces 122 and each has an aperture 127 provided therethrough. A plurality of spaced apart standoffs 128 extend from the interior surfaces 122. The standoffs 128 are preferably cross-shaped, however, other shapes are within the scope of the present invention. A plurality of spaced apart ribs 130 extend from the interior surfaces 122 at an upper end thereof. Each half 66*a*, 66*b* can be formed by injection molding.

When the halves 66*a*, 66*b* are assembled with the inner valve body 64, the halves 66*a*, 66*b* substantially cover the sides of the inner valve body 64. The user grasps the area of the outer grip housing 66*a*, 66*b* which surrounds the elongated portion 86 of the inner valve body 64. The respective apertures 127 and passageways 118 align with each other such that the fastener receiving extensions 126 seat within the countersinks 121, however, the fastener receiving extensions 126 are smaller than the countersinks 121 such that the fastener receiving extensions 126 do not contact the metal inner valve body 64. The halves 66*a*, 66*b* are assembled with the inner valve body 64 by a plurality of fasteners 132, such as bolts, which pass through the apertures 127 and passageways 118. The ribs 130 and the standoffs 128 contact the inner valve body 64, and an air gap 129 is formed between the walls 120 and the inner valve body 64 at the points between the ribs 130 and the standoffs 128. Preferably, the air gap 129 provides a spacing of 0.10" between the walls 120 and the inner valve body 64. Therefore, a minimal amount of surface contact is provided between the metal valve body 64 and the non-conductive grip housing 66*a*, 66*b* which reduces the amount of conduction from the metal valve body 64 to the non-conductive grip housing 66*a*, 66*b*, and thus to the user's hand which surrounds this area. In addition, the air gap 129 allows air flow between the inner valve body 64 and the grip housing 66*a*, 66*b* for convection cooling of the inner metal valve body 64.

A soft grip material 67 preferably surrounds the halves 66*a*, 66*b* of the grip housing. The soft grip material 67 helps to insulate the user from the heat generated by the hydraulic fluid.

Figure 3:
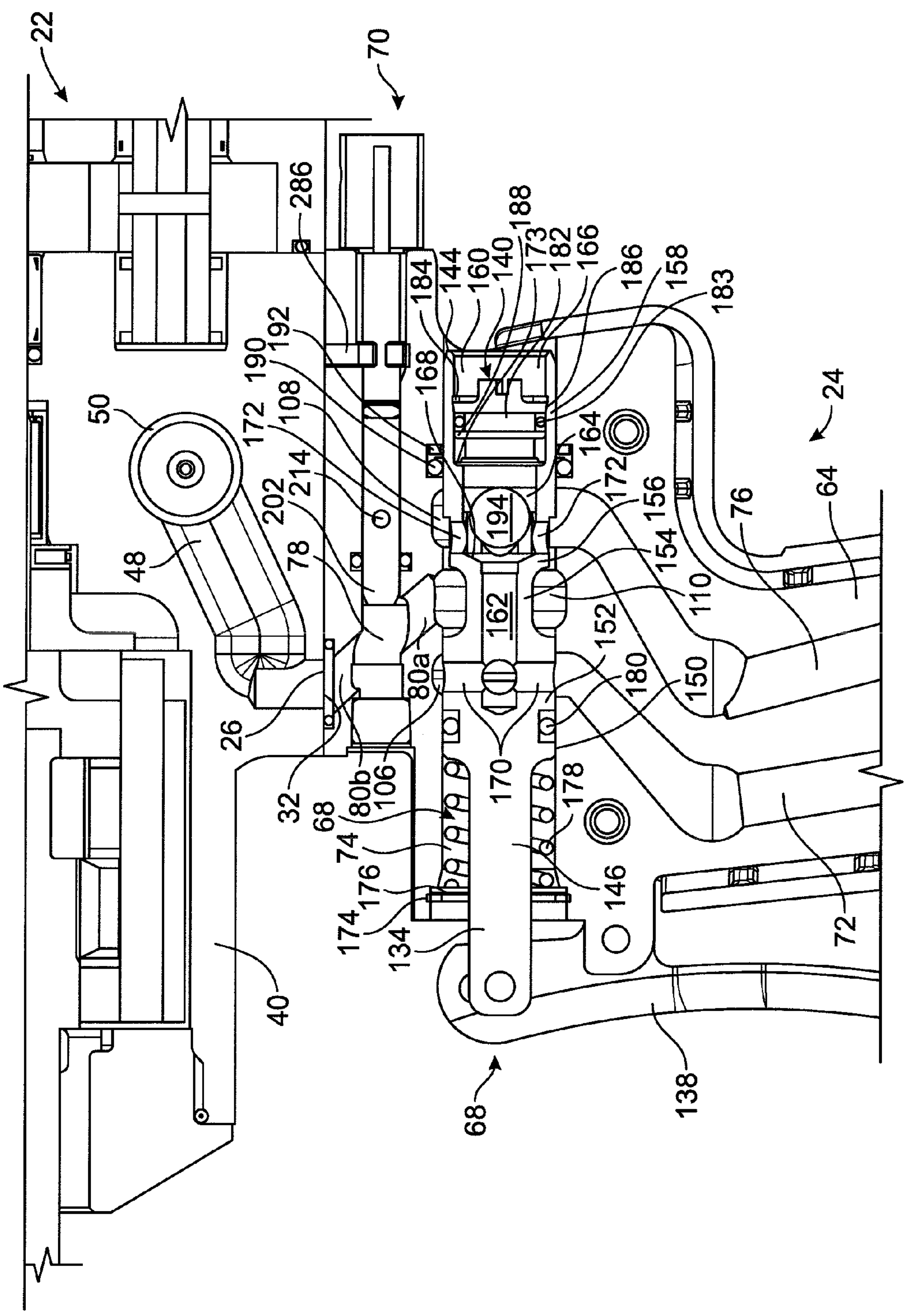
FIG. 3 is a partial cross-sectional view of the tool.
Figure 11:
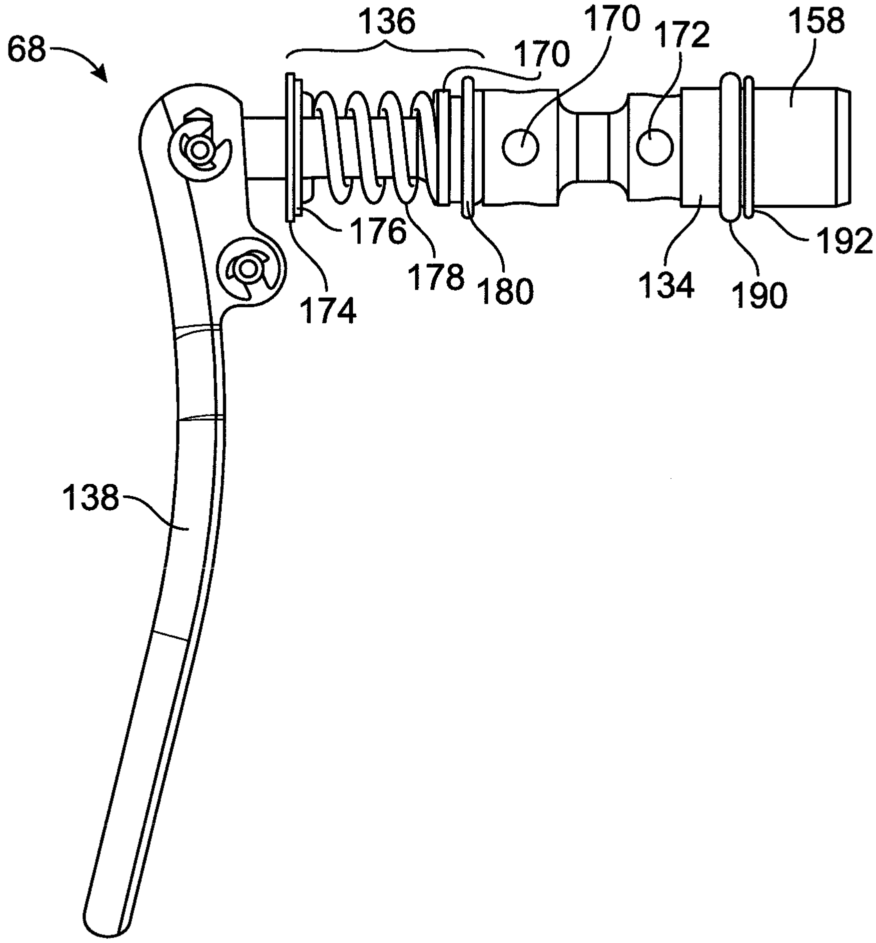
FIG. 11 is a side elevational view of a trigger spool assembly which forms a portion of the tool.
Figure 12:
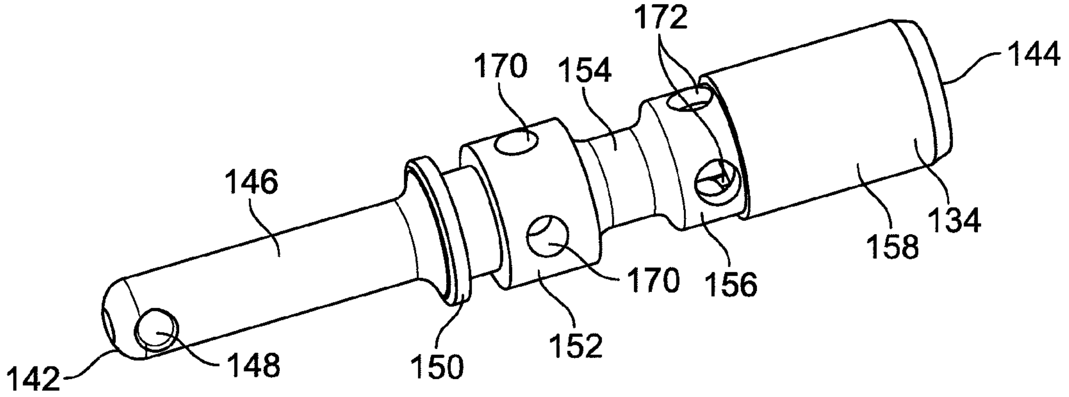
FIG. 12 is a perspective view of a trigger spool which forms part of the trigger spool assembly.

As shown in FIGS. 3, 11 and 12, the trigger spool assembly 68 includes a trigger spool 134 mounted in the trigger spool channel 74, a spring assembly 136 for sealing the trigger spool 134 to the wall forming the trigger spool channel 74 and for biasing the trigger spool 134, a trigger 138 attached by C-clips to the trigger spool 68 which extends from the trigger spool channel 74, and a system adjusting spool assembly 140 provided in a rear end of the trigger spool 134. The trigger 138 can be depressed by the user to move the trigger spool 134 backward and forward along the axis 92 in the trigger spool channel 74.

The trigger spool 134 is generally cylindrical. A first cylindrical section 146 of the trigger spool 134 extends rearwardly a predetermined distance from the front end 142. An aperture 148 is provided through the first section 146 proximate to the front end 142 for connection of the trigger spool 134 to the trigger 138. The first section 146 has a predetermined outer diameter which is smaller than the inner diameter of the trigger spool channel 74. A flange 150 extends from the first section 146 at a position spaced from the front end 142. The flange 150 has an outer diameter which is approximately the same as the inner diameter of the trigger spool channel 74. A second section 152 extends from the rear end of the first section 146. The second section 152 has an outer diameter which is approximately the same as the inner diameter of the trigger spool channel 74. A third section 154 extends from the rear end of the second section 152. The third section 154 has an outer diameter which is approximately the same as the first section 146 and thus is smaller than the inner diameter of the trigger spool channel 74. A fourth section 156 extends from the rear end of the third section 154. The fourth section 156 has an outer diameter which is less than the diameter of the second section 152, but greater than the outer diameter of the third section 154. A fifth section 158 extends from the rear end of the fourth section 156. The fifth section 158 has an outer diameter which is approximately the same as the inner diameter of the trigger spool channel 74, and is larger than the diameter of the fourth section 156.

A central bore 160, FIG. 3, extends from the rear end of the trigger spool 134 and extends axially forwardly through the fifth, fourth, third and second sections 158, 156, 154, 152. The central bore 160 terminates in the second section 152. The central bore 160 has a forward portion 162, an intermediate portion 164 and a rearward portion 166. The forward portion 162 extends through the second and third sections 152, 154 and is smaller in dimension than the intermediate portion 164 which extends through the fourth section 156 and part of the fifth section 158. As a result, a seat 168 is formed between the forward and intermediate portions 162, 164 of the central bore 160. A first set of four spaced apart passageways 170 extend radially outwardly from the forward portion 162 of the central bore 160 through the second section 152 of the trigger spool 134. A second set of four spaced apart passageways 172 extend radially outwardly from the intermediate section 164 of the central bore 160 through the fourth section 156 of the trigger spool 134. The rearward portion 166 of the central bore 160 is threaded and extends through the fifth section 158 of the trigger spool 134. The rearward portion 166 of the central bore 160 is larger in dimension than the intermediate portion 164 of the central bore 160, and as a result, a seat 173 is formed between the intermediate and rearward portions 164, 166. The rear end 144 of the central bore 160 is open and thus is accessible to the user.

The trigger spool 134 is mounted in the trigger spool channel 74 such that the front end of the trigger spool 134 extends outwardly from the front end of the tool 20 and connects to the trigger 138. The spring assembly 136 seats between the flange 150 and the front end 94 of the trigger spool platform 88. The spring assembly 136 includes a C-clip 174 which seats within the corresponding C-clip receiving groove 102 in the trigger spool channel 74, a washer 176 which seats against the C-clip 174, a spring 178 seated between the washer 176 and the flange 150, and a rubber O-ring 180 which seats around the first section 146 between the flange 150 and the second section 152. The trigger spool 74 can move axially along the trigger spool channel 74 by compressing the spring 178.

As shown in FIG. 3, the system adjusting spool assembly 140 is mounted within the trigger spool 134. The system adjusting spool assembly 140 includes an adjusting spool 182 which seats within the intermediate and rearward sections 164, 166 of the central bore 160 and is sealed thereto by a rubber O-ring 183. A C-clip 184 seats within a sloped recess 186 provided in the wall forming the rearward section 166. A user can adjust the position of the adjusting spool 182 by screwing the adjusting spool 182 forward to move the adjusting spool 182 along the trigger spool channel 74 until ball 194 seats on seat 168, or can be screwed in reverse until the adjusting spool 182 backs onto C-clip 184. The C-clip 184 holds the adjusting spool 182 in position and prevents the removal of the adjusting spool 182 from the central bore 160. A rubber O-ring 190 and back up ring 192 seat around the fifth section 158 and seat within the enlarged O-ring receiving groove 104. The system adjusting spool assembly 140 includes a ball 194 which seats within the fourth and fifth sections 156, 158 of the central bore 160. The ball 194 abuts against the forward end of the adjusting spool 182. The ball 194 is moved by the user adjusting the position of the adjusting spool 182. The ball 194 can be moved to seat against the seat 168, thus closing the fluid communication between the forward portion 162 and the intermediate portion 164 (and thus the radial passageways 172), or can be moved away from the seat 168, thus opening the fluid communication between the forward portion 162 and the intermediate portion 164 (and thus the radial passageways 172).

When the trigger 138 is not depressed, the first set of passageways 170 are in alignment with the inlet channel 72 to receive hydraulic fluid. If the tool 20 is to be operated in an open-center configuration, the system adjusting spool assembly 140 is adjusted to move the ball 194 away from the seat 168. As a result, the hydraulic fluid can continuously flow from the supply, through the inlet channel 72, through the first set of passageways 170, through the forward portion 162 of the central bore 160, past the seat 168, into the intermediate section 163 of the central bore 160, through the second set of passageways 172 and into the return channel 76. If the tool 20 is to be operated in a closed-center configuration, the system adjusting spool assembly 140 is adjusted to move the ball 194 against the seat 168. As a result, the hydraulic fluid cannot flow into the intermediate section 163 of the central bore 160 and through the second set of passageways 172.

Figure 16:
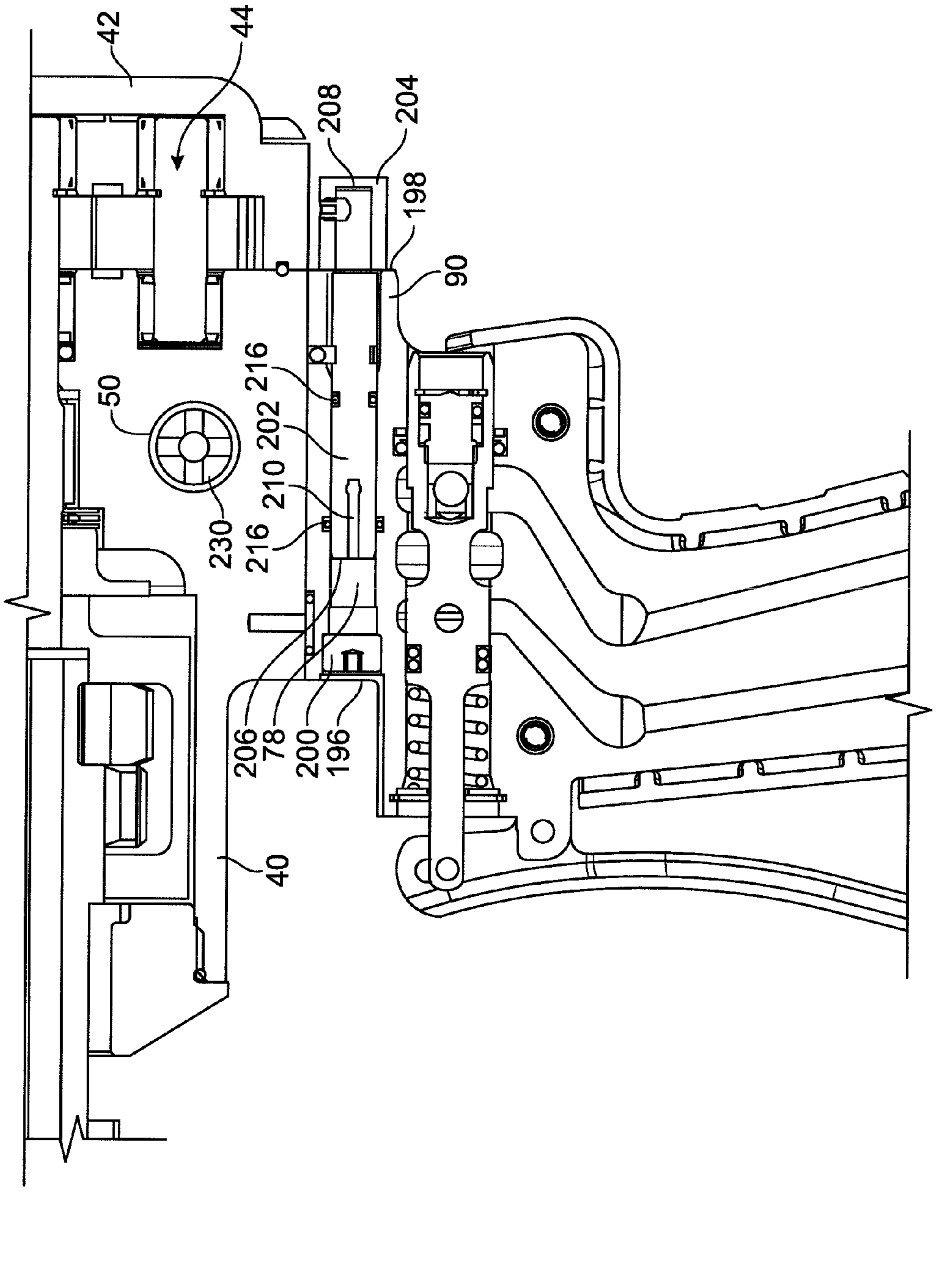
FIG. 16 is a cross-sectional view of the tool.

The bypass spool channel 78 is generally cylindrical and extends from a front end 196 of the bypass spool platform 90 to a rear end 198 of the bypass spool platform 90. The front end of the bypass spool channel 78 is closed by an adjusting spool 200 as shown in FIG. 16. The rear end of the bypass spool channel 78 is open.

Figure 13:
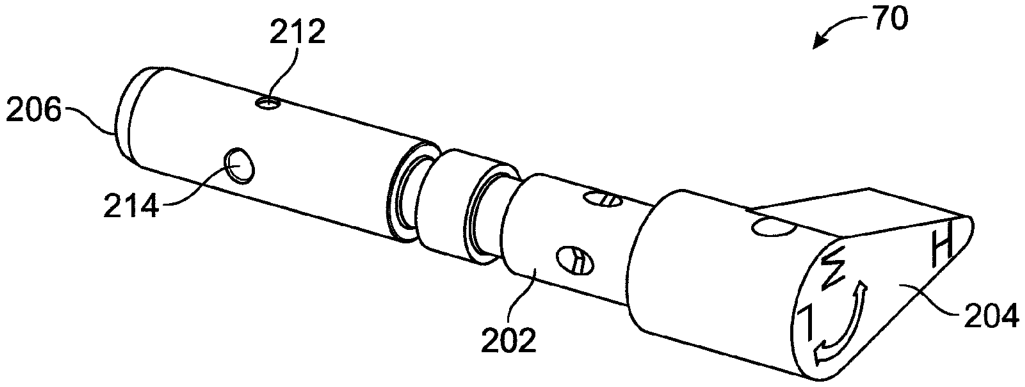
FIG. 13 is a perspective view of a bypass spool assembly which forms a portion of the tool.
Figure 14:
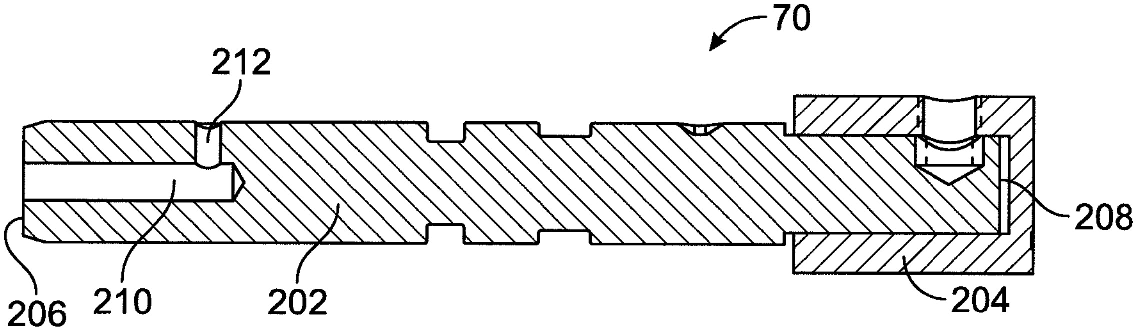
FIGS. 14 and 15 are cross-sectional views of the bypass spool assembly.
Figure 15:
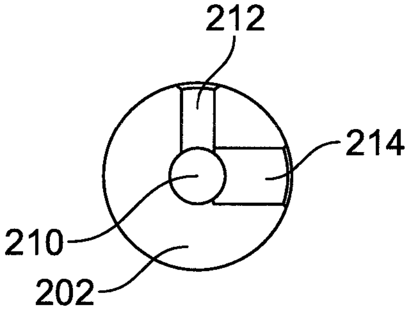

The bypass spool assembly 70, see FIGS. 13 and 14, includes a bypass spool 202 which is seated in the bypass spool channel 78, and a knob 204. The bypass spool 202 is generally cylindrical and has first and second opposite ends 206, 208. The second end 208 of the bypass spool 202 extends outwardly from the bypass spool channel 78 and the knob 204 is mounted thereon by suitable means. A central bore 210 extends rearwardly from the first end 206 of the bypass spool 202 a predetermined distance. The open end of the central bore 210 is in fluid communication with the transfer channel 80*a*, 80*b*. First and second passageways 212, 214, FIGS. 14 and 15, extend radially outwardly from the central bore 210 proximate to, but spaced from, the first end 206 thereof. The passageways 212, 214 are perpendicular to each other. The first passageway 212 has a smaller diameter than the second passageway 214. The bypass spool 202 is sealed to the bypass spool channel 78 by a pair of spaced apart O-rings 216. The bypass spool 202 can be rotated to be in one of three discrete positions within the bypass spool channel 78 by a user grasping the knob 204 and rotating it. In a first position, neither radial passageway 212, 214 aligns with the port 116 (which connects the bypass spool channel 78 to the return transfer channel 82) and hydraulic fluid does not flow through the central bore 210 to either radial passageway 212, 214. This configuration provides for high revolutions per minute (rpm) of the gear motor 44 as the all of the hydraulic fluid flows to the work unit assembly 22. In the second position, radial passageway 212 aligns with the port 116, and hydraulic fluid flows through the central bore 210, to the first, smaller radial passageway 212, through port 116, through the return channel 82, through enlarged chamber 108, and into return channel 76. This configuration provides for medium revolutions per minute (rpm) of the gear motor 44 as most of the hydraulic fluid flows to the work unit assembly 22, but some of the hydraulic fluid is diverted to the return channel 76. In the third position, radial passageway 214 aligns with the port 116, and hydraulic fluid flows through the central bore 210 to the second, larger radial passageway 214, through port 116, through the return channel 82, through enlarged chamber 108, and into return channel 76. This configuration provides for low revolutions per minute (rpm) of the gear motor 44 as most of the hydraulic fluid is diverted to the return channel 76, and some of the hydraulic fluid flows to the work unit assembly 22. The work assembly unit 22, is connected to the rotary impact mechanism 47. Therefore, the hydraulic motor work assembly revolutions per minute (rpm) will govern the output torque of the tool 20.

As a result of this structure, the bypass spool assembly 70 is formed from a movable bypass spool 202 which form a valveless conduit. The bypass spool 202 is adapted for diverting a portion of the inlet flow from entering the work unit 22 directly to a return flow from the work unit 22. The bypass spool 202 is movable about an axis generally orthogonal to an axis of movement of a motor reversing spool 230 discussed herein.

Figure 18:
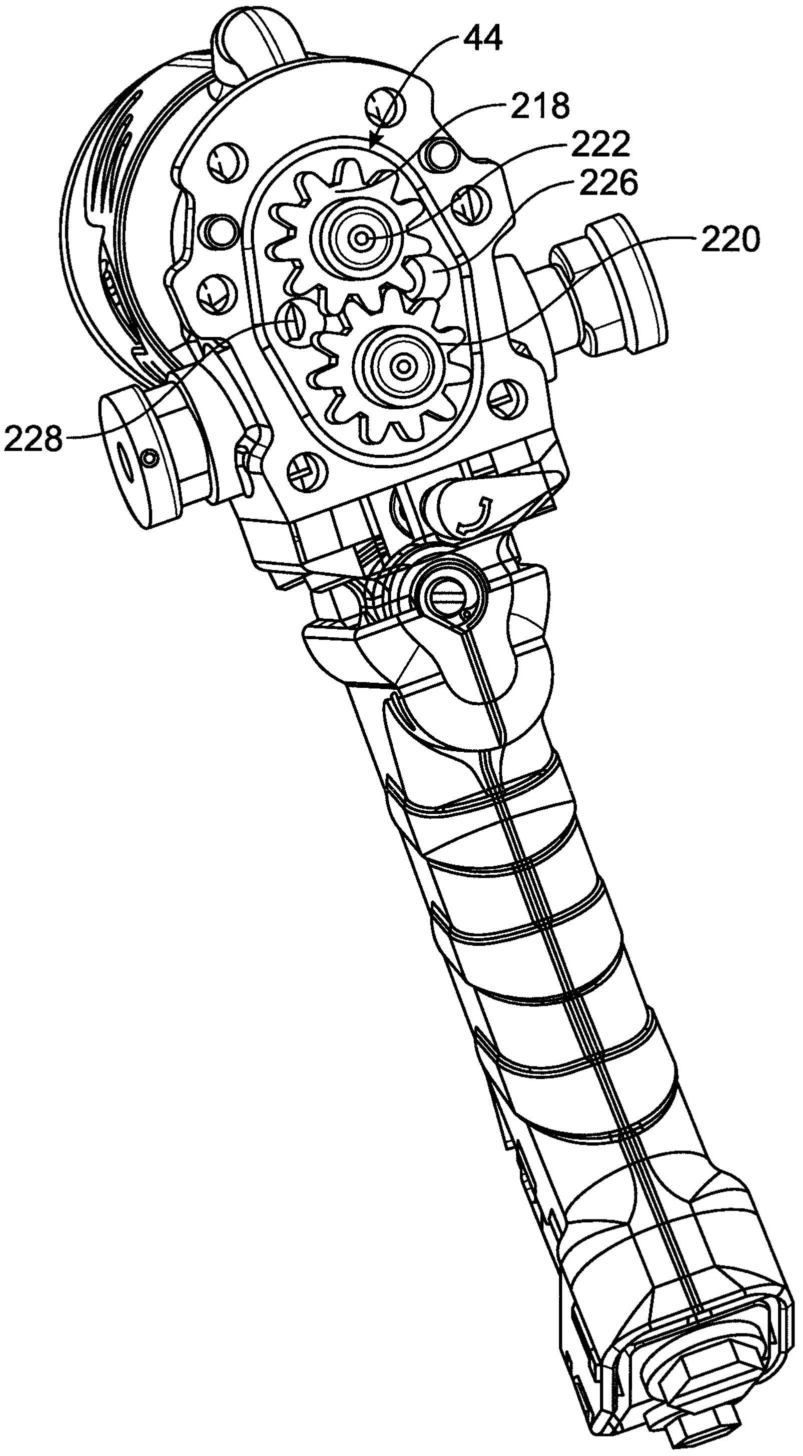
FIGS. 18-21 are various cross-sectional views of the tool.

As shown in FIGS. 2 and 18, the gear motor 44 includes a pair of gears 218, 220 which drive a shaft 222 that drives the chuck 46 by known means. The gears 218, 220 seat within a gear chamber 224 formed between the impact mechanism housing 40 and the motor housing 42. The gears 218, 220 intermesh with each other and can be driven clockwise or counterclockwise in order to drive the chuck 46 in a clockwise or counterclockwise direction. First and second motor ports 226, 228 feed hydraulic fluid into the gear chamber 224 as discussed herein.

As shown in FIG. 3, the impact mechanism housing 40 has a pressure supply channel 48 which extends from the inlet port 26 to a reversing spool channel 50 in which the motor reversing spool assembly 62 is mounted. As shown in FIGS. 19 and 20, the impact mechanism housing 40 further has a first transfer channel 52 extending from the reversing spool channel 50 to the first motor port 226, and a second transfer channel 54 extending from the reversing spool channel 50 to the second motor port 228. A first return channel 56 extends from the reversing spool channel 50 to the port 28 and connects with port 34 and first return transfer channel 82 in the grip assembly 24. A second return channel 58 extends from the reversing spool channel 50 to the port 30 and connects with port 36 and second return transfer channel 84 in the grip assembly 24.

Figure 22:
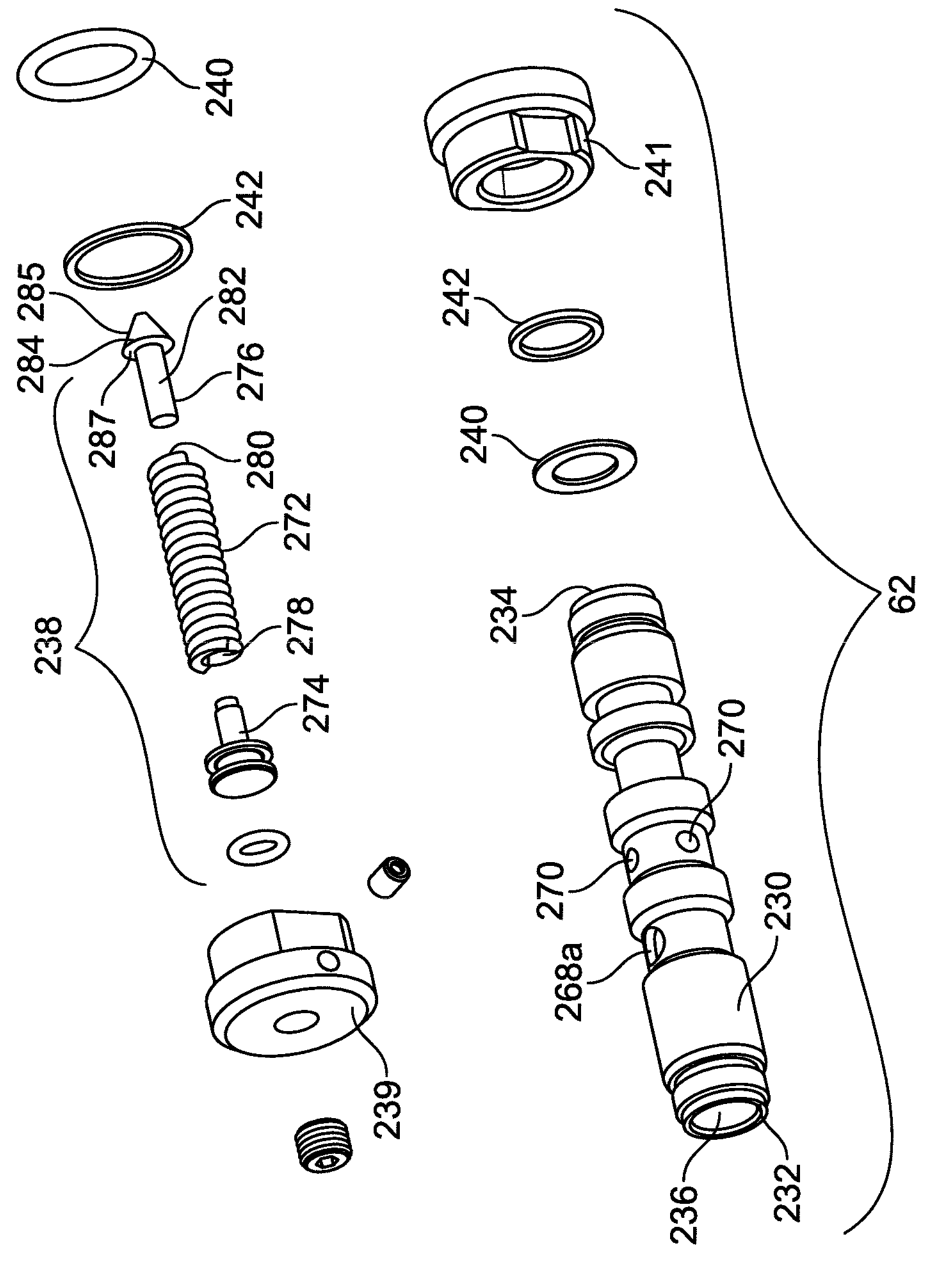
FIG. 22 is an exploded perspective view of a reversing spool assembly which forms a portion of the tool.
Figure 23:
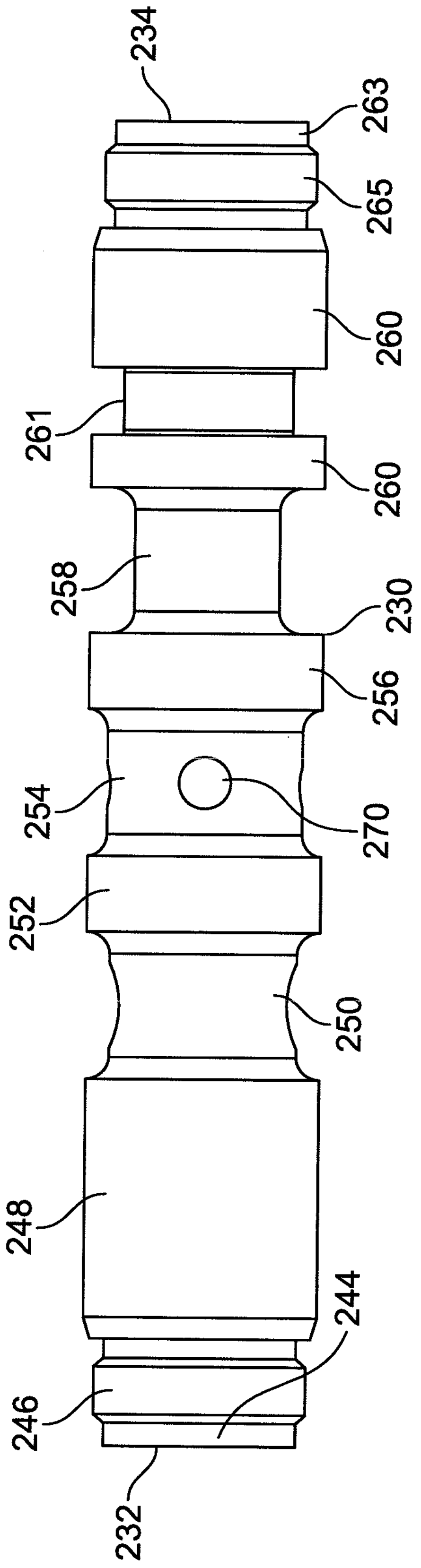
FIG. 23 is a side elevational view of a reversing spool which forms a portion of the reversing spool assembly.
Figure 24:
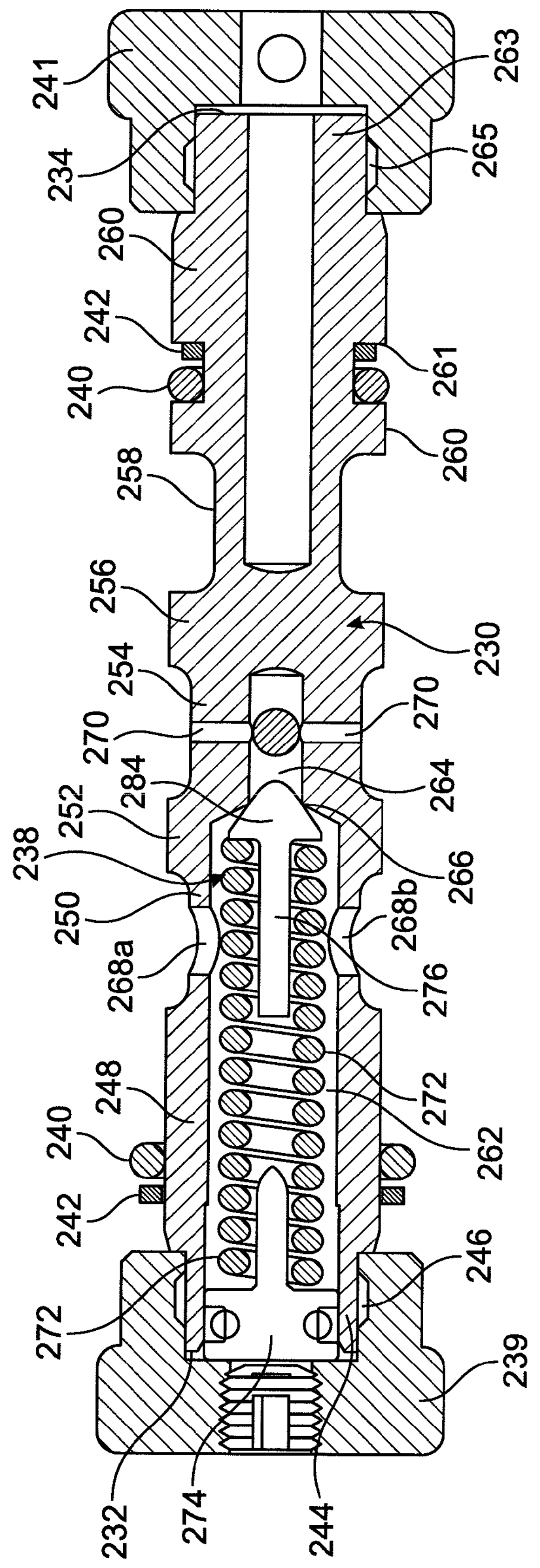
FIG. 24 is a cross-sectional view of the reversing spool assembly.

The motor reversing spool assembly 62, which is shown in FIGS. 22-24, includes a reversing spool 230 having first and second ends 232, 234 and a central bore 236 extending from the first end 232 a predetermined distance, a spring biased relief valve assembly 238 mounted within the central bore 236, a first handle 239 provided at the first end 232 of the reversing spool 230 which closes the open end of the central bore 236, and second handle 241 provided at the second end 234 of the reversing spool 230. Rubber O-rings and back-up rings 240, 242 seal the reversing spool 230 to the wall that forms the reversing spool channel 50. The relief valve assembly 238 limits the torque of the gear motor 44, and always dumps flow to port 30 when the relief valve assembly 238 is activated.

The reversing spool 230 is generally cylindrical. A first section 244 extends from the front end 232 and has a predetermined outer diameter which is smaller than the inner diameter of the reversing spool channel 50. A flange 246 extends from the first section 244 at a position spaced from the end 232 to provide a means for attaching the handle 239. A second section 248 extends from the rear end of the first section 244. The second section 248 has an outer diameter which is approximately the same as the inner diameter of the reversing spool channel 50. A third section 250 extends from the rear end of the second section 248. The third section 250 has an outer diameter which is less than the diameter of the second section 248 and thus is smaller than the inner diameter of the reversing spool channel 50. A fourth section 252 extends from the rear end of the third section 250. The fourth section 252 has an outer diameter which is the same as than the diameter of the second section 248. A fifth section 254 extends from the rear end of the fourth section 252. The fifth section 254 has an outer diameter which is the same as the third section 250. A sixth section 256 extends from the rear end of the fifth section 254. The sixth section 256 has an outer diameter which is the same as than the diameter of the second section 248 and the fourth section 252. A seventh section 258 extends from the rear end of the sixth section 256. The seventh section 258 has an outer diameter which is the same as the third and fifth sections 250, 254. An eighth section 260 extends from the rear end of the seventh section 258. The eighth section 260 has an outer diameter which is the same as than the diameter of the second, fourth and sixth sections 248, 252, 256. The eighth section 260 has a groove 261 therein into which an O-ring is seated. A ninth section 263 extends from the eighth section 260 and has a flange 265 extending therefrom at a position spaced from the end 234 to provide a means for attaching the handle 241.

A first portion 262 of the central bore 236 extends from the first end 232 of the reversing spool 230 and extends axially forwardly through the first, second, third and fourth sections 244, 248, 250, 252. A second portion 264 of the central bore 236 starts at the end of the first portion 262 and extend through the fifth portion 254. The first portion 262 is larger in dimension than the second portion 264. As a result, a seat 266 is formed between the first and second portions 262, 264. A first set of diametrically opposed passageways 268*a*, 268*b* extend radially outwardly from the first portion 262 through the third section 250. A set of four spaced apart passageways 270 extend radially outwardly from the second portion 264 through the fifth section 254. The reversing spool 230 is mounted in the reversing spool channel 50 such that the ends 232, 234, and thus the handles 239, 241, extend outwardly from the sides of the tool 20.

The spring biased relief valve assembly 238 is mounted in, and extends substantially the entire length of, the first portion 262 of the central bore 236. The spring biased relief valve assembly 238 includes a spring 272 sandwiched between a pair of pins 274, 276. Pin 274 abuts against the handle 239 and against a first end 278 of the spring 272. Pin 276 abuts against a second end 280 of the spring 272. Pin 276 has a shaft 282 which seats within the coils of the spring 272 and an enlarged cone-shaped head 284 which extends outwardly from the second end 280 of the spring 272. A front surface 285 of the cone-shaped head 284 can be biased via the spring 272 to be in engagement with the seat 266 of the central bore 236. A rear surface 287 of the cone-shaped head 284 is in engagement with the second end 280 of the spring 272. The front surface 28 mated with seat 266, and the rear surface 287 each define an area. Instead of being cone-shaped, other forms may be provided, for example, a stepped shape.

A flange 286, FIG. 3, is retained by the underside of the impact mechanism housing 40 and extends into bypass spool channel 78 to prevent the removal of the bypass spool 202 from the bypass spool channel 78, when connected to grip assembly 24.

Now that the specifics of the components of the tool 20 have been described, the method of using the tool 20 will be described.

As discussed above, the tool 20 can be used in an open-center configuration or a closed-center configuration. To operate the tool 20 in an open-center configuration, the system adjusting spool assembly 140 is adjusted to move the ball 194 away from the seat 168. As a result, the hydraulic fluid can continuously flow from the supply, through the inlet channel 72, through the first set of passageways 170, through the forward portion 162 of the central bore 160, past the seat 168, into the intermediate section 164 of the central bore 160, through the second set of passageways 172 and into the return channel 76 even when the trigger 138 is not depressed. If the tool 20 is to be operated in a closed-center configuration, the system adjusting spool assembly 140 is adjusted to move the ball 194 against the seat 168. As a result, the hydraulic fluid cannot flow into the intermediate section 164 of the central bore 160 and through the second set of passageways 172.

The user must then determine whether the tool 20 is be used to rotate the chuck 46 in a clockwise direction (thus using motor port 226), or a counterclockwise direction (thus using motor port 228). The motor reversing spool assembly 62 controls the direction the gear motor spins by diverting flow to either motor port 226, 228. The motor port 226, 228 which is not pressurized dumps flow to one of ports 28, 30, depending upon which motor port 226, 228 is pressurized.

Operation of the tool is first described with the tool 20 placed into the configuration to rotate the chuck 46 in a counterclockwise direction, thus using motor port 226 as the supply to the gear chamber 224. To do so, the reversing spool 230 is pushed until the handle 239 contacts the side of the impact mechanism housing 40. Supply channel 48 aligns with the fifth section 254 of the reversing spool 230 and the radial passageways 270. The fifth section 254 of the reversing spool 230 also aligns with transfer channel 52 which feeds fluid into motor port 226. Motor port 228 feeds fluid into transfer channel 54.

In either the open-center configuration or the closed-center configuration, when the trigger 138 is depressed, the trigger spool 134 moves axially along the trigger spool channel 74 toward the front end of the tool 20. The third section 154 of the trigger spool 134 aligns with the inlet channel 72 (the radial passageways 170 are moved out of alignment such that fluid cannot flow through the trigger spool 134), and the third and fourth sections 154, 156 span between the enlarged fluid chambers 106 and 110 to allow fluid communication between the enlarged fluid chambers 106 and 110. The fifth section 158 aligns with the enlarged fluid chamber 108 and the return channel 76.

The hydraulic fluid flows from the supply, through port 98, through the supply channel 72, into enlarged fluid chamber 106, between the third and fourth sections 154, 156 of the trigger spool 134 and the wall of the supply channel 72, and then into enlarged fluid chamber 110, through transfer channel 80*a*, into bypass spool channel 78, into transfer channel 80*b*, through ports 32 and 26, into supply channel 48, and into reversing spool channel 50. In the configuration to rotate the chuck 46 in a counterclockwise direction, transfer channel 52 aligns with radial passageways 270; transfer channel 54 aligns with radial passageways 268*a*, 268*b*. As a result, hydraulic fluid flows from supply channel 48, around the fifth section 254 of the reversing spool 230 and through the radial passageways 270 and the second portion 264 of the central bore 236, through transfer channel 52 and through motor port 226 to supply hydraulic fluid to the gear chamber 224 to rotate the gears 218, 220, and thus the chuck 46. Hydraulic fluid flows out of the gear chamber 224, through motor port 228, through transfer channel 54, around the third section 250 of the reversing spool 230 and through the radial passageway 268*a* into first portion 262 of the central bore 260 and through the radial passageway 268*b*, to the return channel 58. Hydraulic fluid then flows through ports 30, 36, into return transfer channel 84, into fluid chamber 108, around fifth section 158 of trigger spool 134, into return channel 76, through port 100 to return to the supply.

The relief valve assembly 238 is provided within the reversing spool 230 and limits the torque of the gear motor 44. When resistance is seen by the gear motor 44, the pressure from the hydraulic fluid builds in the second portion 264 of the central bore 236. When enough pressure builds, the head 284 of the pin 276 unseats from seat 266 and fluid flows past the head 284 into the first portion 262 of the central bore 236 and out the radial passageways 268*a*, 268*b*, to the return channel 58 (that is, the fluid flows from the pressure side of the reversing spool 230 to the side exposed to the return channel 58). The pressure at which hydraulic fluid will be diverted by is determined by the force of the spring 272 and pressure in the return channel 58.

Therefore, when the reversing spool 230 is set to drive the tool 20 in reverse (counterclockwise), the rear surface 287 of the head 284 of the relief valve assembly 238 is exposed to the channel 54 from the gear chamber 224. The channel 54 usually has some residual back pressure built up as a result of being used to return hydraulic fluid through the circuit to the supply. This pressure built up in the channel 54 acts on the rear surface 287 which creates a force. The pressure side force on the front surface 285 of the head 284 created by the pressure on that side must counteract this pressure on the rear surface 287 to unseat the head 284 and relieve the pressure. After leaving the area around the third section 250 of the reversing spool 230, fluid flows to the trigger spool 134 where the fluid is drained out of the tool 20. Once the pressure is relieved, the spring 272 expands to reseat the head 284 against the seat 266. The relief valve 238 can be activated and closed as many times during operation as is necessary.

The above operation assumes that the bypass spool 202 is in the position where no flow of hydraulic fluid is being diverted therethrough. In the situation where the bypass spool 202 is turned to the second position, radial passageway 212 aligns with the port 116 and hydraulic fluid flows through the central bore 210, to the first, smaller radial passageway 212, through port 116, through the return channel 82, through enlarged chamber 108, and into return channel 76. This configuration provides for medium revolutions per minute (rpm) of the gear motor 44 as most of the hydraulic fluid flows to the work unit assembly 22, but some of the hydraulic fluid is diverted to the return channel 76. In the situation where the bypass spool 202 is turned to the third position, hydraulic fluid flows through the central bore 210 to the second, larger radial passageway 214, through port 116, through the return channel 82, through enlarged chamber 108, and into return channel 76. This configuration provides for low revolutions per minute (rpm) of the gear motor 44 as most of the hydraulic fluid is diverted to the return channel 76, and some of the hydraulic fluid flows to the work unit assembly 22. In this tool 20, the bypass operation takes place in the line of flow before the hydraulic fluid reaches the motor reversing spool assembly 62. The bypass valve assembly 70 connects the pressure side of the circuit to the return side of the circuit. The bypass valve assembly 70 regulates the revolutions per minute (rpm) of the gear motor 44 by diverting flow that would normally pass the motor reversing spool assembly 62 and power the gear motor 44. By bypassing flow directly to the supply between the trigger spool assembly 68 and the motor reversing spool assembly 62, the flow used to the power the gear motor 44 is reduced, thus reducing the revolutions per minute (rpm) of the gear motor 44. In this tool 20, speed regulates torque.

Operation of the tool is now described with the tool 20 placed into the configuration to rotate the chuck 46 in a clockwise direction, thus using motor port 228 as the supply to the gear chamber 224. To do so, the reversing spool 230 is pushed until the handle 241 contacts the side of the impact mechanism housing 40. Supply channel 48 remains aligned with the fifth section 254 of the reversing spool 230 and the radial passageways 270. Since the position of the reversing spool 230 has been shifted, the fifth section 254 of the reversing spool 230 now also aligns with transfer channel 54 which feeds fluid into motor port 228. Transfer channel 52 aligns with the seventh section 258 of the reversing spool 230. The radial passageway 268*b* remains aligned with the return channel 58, but are not aligned with the channel 54.

In either the open-center configuration or the closed-center configuration, when the trigger 138 is depressed, the trigger spool 134 moves axially along the trigger spool channel 74 toward the front end of the tool 20. The third section 154 of the trigger spool 134 aligns with the inlet channel 72 (the radial passageways 170 are moved out of alignment such that fluid cannot flow through the trigger spool 134), and the third and fourth sections 154, 156 span between the enlarged fluid chambers 106 and 110 to allow fluid communication between the enlarged fluid chambers 106 and 110. The fifth section 158 aligns with the enlarged fluid chamber 108 and the return channel 76.

The hydraulic fluid flows from the supply, through port 98, through the supply channel 72, into enlarged fluid chamber 106, between the third and fourth sections 154, 156 of the trigger spool 134 and the wall of the supply channel 72, and then into enlarged fluid chamber 110, through transfer channel 80*a*, into bypass spool channel 78, into transfer channel 80*b*, through ports 32 and 26, and into supply channel 48. Hydraulic fluid flows from supply channel 48, around the fifth section 254 of the reversing spool 230 and through the radial passageways 270 and the second portion 264 of the central bore 236, through transfer channel 54 and through motor port 228 to supply hydraulic fluid to the gear chamber 224 to rotate the gears 218, 220, and thus the chuck 46. Hydraulic fluid flows out of the gear chamber 224, through motor port 226, through transfer channel 52, around the seventh section 258 of the reversing spool 230, to the return channel 58. Hydraulic fluid then flows through ports 30, 36, into return transfer channel 84, into fluid chamber 108, around fifth section 158 of trigger spool 134, into return channel 76, through port 100 to return to the supply.

When resistance is seen by the gear motor 44, the pressure from the hydraulic fluid builds in the second portion 264 of the central bore 236. When enough pressure builds, the head 284 of the pin 276 unseats from seat 266 and fluid flows past the head 284 into the first portion 262 of the central bore 236 and out the radial passageways 268*a*, 268*b*, to the return channel 58 (that is, the fluid flows from the pressure side of the reversing spool 230 to the side exposed to the return channel 58). The pressure at which hydraulic fluid will be diverted by is determined by the force of the spring 272. Once the pressure is relieved, the spring 272 expands to reseat the head 284 against the seat 266. The relief valve 238 can be activated and closed as many times during operation as is necessary.

When the reversing spool 230 is positioned to drive the tool 20 forward (clockwise) the fluid return channel switches and therefore, motor 44 does not drain fluid behind the relief valve 238. The fluid drains directly to the return channel 56 and proceeds to enlarged fluid chamber 108. Since there is a pressure drop ($\Delta p$) from the loss of energy of the fluid between these locations, the pressure around the trigger spool 134 in chamber 108 is less than the pressure in the area around the reversing spool 230 in channel 56. The channel 58 is exposed to the rear surface 287 of the pin 276 on the opposite end of the reversing spool 230. Since fluid does not pass behind the pin 276 from the motor 44, the pressure behind the pin 276 is the same as the pressure in the chamber 108 around the trigger spool 134.

The above operation assumes that the bypass spool 202 is in the position where no flow of hydraulic fluid is being diverted therethrough. In the situation where the bypass spool 202 is turned to the second position, radial passageway 212 aligns with the port 116 and hydraulic fluid flows through the central bore 210, to the first, smaller radial passageway 212, through port 116, through the return channel 82, through enlarged chamber 108, and into return channel 76. This configuration provides for medium revolutions per minute (rpm) of the gear motor 44 as most of the hydraulic fluid flows to the work unit assembly 22, but some of the hydraulic fluid is diverted to the return channel 76. In the situation where the bypass spool 202 is turned to the third position, hydraulic fluid flows through the central bore 210 to the second, larger radial passageway 214, through port 116, through the return channel 82, through enlarged chamber 108, and into return channel 76. This configuration provides for low revolutions per minute (rpm) of the gear motor 44 as most of the hydraulic fluid is diverted to the return channel 76, and some of the hydraulic fluid flows to the work unit assembly 22. In this tool 20, the bypass operation takes place in the line of flow before the hydraulic fluid reaches the motor reversing spool assembly 62. The bypass valve assembly 70 connects the pressure side of the circuit to the return side of the circuit. The bypass valve assembly 70 regulates the revolutions per minute (rpm) of the gear motor 44 by diverting flow that would normally pass the motor reversing spool assembly 62 and power the gear motor 44. By bypassing flow directly to the supply between the trigger spool assembly 68 and the motor reversing spool assembly 62, the flow used to the power the gear motor 44 is reduced, thus reducing the speed output of the gear motor 44.

Therefore, the same relief valve 238 is capable of being activated to relieve pressure when the gear motor 44 is being operated to drive the tool 20 in reverse (counterclockwise) and to drive the tool 20 forward (clockwise). In reverse, a higher pressure is provided behind the head 284 of the relief valve 238 because the head 284 is exposed to the pressure of the fluid as it directly leaves the channel 54. In the forward operation, the relief valve 238 is not exposed to the return flow from the gear motor 44. Therefore, the rear surface 287 of the relief valve 238 is only exposed to pressure in the channel 58 which is equal to pressure in chamber 108 since it is not exposed to channel 54. Since the pressure on the channel 58 is less in forward operation than in reverse, the orientation for reverse operation causes the relief valve 238 to have a higher pressure on the rear surface 287 than in the forward orientation. This provides a higher force on the rear surface 287 in that orientation and therefore, a higher pressure is needed in second portion 264 of the central bore 236 to open the relief valve 238. When the reversing spool 230 is positioned to drive the tool 20 forward (clockwise), the pressure needed to unset the pin 276 is less than in the reverse (counterclockwise). This is done by exposing the dumping side of the relief valve 238 to different pressures, thus in the reverse (counterclockwise) rotating position, more pressure works on the rear area of the pin 276. Thus, more pressure must work on the front surface 28 to unseat the pin 276. This is useful when hydraulic motor torque differential settings are needed in forward and reverse.

As a result of the structure of the tool 20, the trigger spool assembly 68 is downstream of the inlet port 98 and controls the flow of fluid to the work unit 22. The bypass valve assembly 70 is disposed downstream of the trigger spool assembly 68. The motor reversing assembly 62 is disposed downstream of the bypass valve assembly 70.

While several components are referred to as a "spool" in the preferred embodiment disclosed herein, the spools may be any component, such as, in non-limiting embodiments, a valve, that otherwise provides for the functions described herein. Similarly, other "spools" disclosed herein may be suitably replaced by other components, such as other types of valves.

In addition to the foregoing aspects of the fluid control system described, it is within the teachings herein to include diversion from the flow of oil at selected locations for other purposes. That is, in addition to the features above, the fluid control system 1 may contain bleeder valves or other features that provide oil supply for such purposes as tool lubrication.

One skilled in the art will recognize that the invention disclosed herein is not limited to use in a variable torque impact wrench. For example, the fluid control system disclosed herein may be used in wrenches, grinders, drills, chain saws, pole saws, circular saws, pruners, tampers, and other tools having similar power requirements. As another example, features of the present invention could be used in a pneumatic tool rather than a hydraulic tool. Therefore, it is within the teachings contained herein to use this invention, and variations thereof, in other applications.

While a preferred embodiment of the present invention is shown and described, it is envisioned that those skilled in the art may devise various modifications of the present invention without departing from the spirit and scope of the appended claims.

The invention claimed is:

1. A hydraulically driven tool comprising:

a body formed of a heat transmissive material, the body having at least one channel through which a high temperature fluid flows, wherein heat is transmitted to the body as a result of contact with the high temperature fluid, the body defining a perimeter;

a non-conductive housing having an interior surface and an exterior surface, the interior surface facing the body, the interior surface defining a cavity in which the body is seated and which extends around the perimeter of the body; and the interior surface of the non-conductive housing having a plurality of spaced apart standoffs extending therefrom, the standoffs contacting the body, such that an air gap is formed between the interior surface of the non-conductive housing and the body at locations where standoffs of the non-conductive housing are not provided;

wherein the housing and body form a handle of the tool which in use is configured to have a user's hand contact a portion of the exterior surface of the housing such that the user's hand is adjacent to the body, the channel and at least a portion of the standoffs wherein the air gap provides a spacing of 0.10" between the interior surface of the non-conductive housing, and the body.

2. The hydraulically driven tool as defined in claim 1, wherein the interior surface of the non-conductive housing has a plurality of fastener receiving extensions extending therefrom toward the body, each fastener receiving extension having an aperture provided therethrough.

3. The hydraulically driven tool as defined in claim 2, wherein the body includes a plurality of passageways therethrough, each passageway having a countersink provided in the body at each end thereof, wherein respective apertures and respective passageways align with each other such that the fastener receiving extensions seat within the countersinks, the fastener receiving extensions being smaller than the countersinks such that the fastener receiving extensions do not contact the body.

4. The hydraulically driven tool as defined in claim 3, further including a plurality of fasteners, respective fasteners extending through the aligned apertures and passageways.

5. The hydraulically driven tool as defined in claim 1, wherein the standoffs are cross-shaped.

6. The hydraulically driven tool as defined in claim 1, wherein the interior surface of the non-conductive housing further has a plurality of spaced apart ribs extending therefrom.

7. The hydraulically driven tool as defined in claim 1, wherein the housing is formed in two parts and is formed by injection molding.

8. The hydraulically driven tool as defined in claim 1, further including a grip material on the housing.

9. A hydraulically driven tool comprising:

a body formed of a heat transmissive material, the body having at least one channel through which a high temperature fluid flows, wherein heat is transmitted to the body as a result of contact with the high temperature fluid, the body including a plurality of passageways therethrough, each passageway having a countersink provided in the body at each end thereof;

a non-conductive housing partially surrounding the body, the housing having an interior surface and an exterior surface, the interior surface facing the body;

the interior surface of the non-conductive housing having a plurality of spaced apart standoffs and a plurality of ribs extending therefrom, the standoffs and the ribs contacting the body, such that an air gap is formed between the interior surface and the body at locations where standoffs and ribs are not provided;

the interior surface of the non-conductive housing having a plurality of fastener receiving extensions extending therefrom toward the body, each fastener receiving extension having an aperture provided therethrough, wherein respective apertures and respective passageways align with each other such that the fastener receiving extensions seat within the countersinks, the fastener receiving extensions being smaller than the countersinks such that the fastener receiving extensions do not contact the body;

a plurality of fasteners, respective fasteners extending through the aligned apertures and passageways; and a grip material on the non-conductive housing;

wherein the housing and body form a handle of the tool which in use is configured to have a user's hand contact a portion of the exterior surface of the housing such that the user's hand is adjacent to the body, the channel, at least a portion of the standoffs and at least a portion of the ribs.

10. The hydraulically driven tool as defined in claim 9, wherein the air gap provides a spacing of 0.10" between the interior surface and the body.

11. The hydraulically driven tool as defined in claim 9, wherein the standoffs are cross-shaped.

12. The hydraulically driven tool as defined in claim 9, wherein the body is formed of aluminum and the non-conductive housing is formed of nylon.

13. The hydraulically driven tool as defined in claim 9, wherein the non-conductive housing is formed in two parts and formed by injection molding.

14. The hydraulically driven tool as defined in claim 2, wherein the body includes a plurality of passageways therethrough, each passageway having a countersink provided in the body at each end thereof, wherein respective apertures and respective passageways align with each other such that the fastener receiving extensions seat within the countersinks.

15. The hydraulically driven tool as defined in claim 14, further including a plurality of fasteners, respective fasteners extending through the aligned apertures and passageways.

16. The hydraulically driven tool as defined in claim 2, wherein the interior surface of the non-conductive housing further has a plurality of spaced apart ribs extending therefrom.

17. The hydraulically driven tool as defined in claim 1, wherein the body is formed of aluminum and the non-conductive housing is formed of nylon.

18. A hydraulically driven tool comprising:

a body formed of a heat transmissive material, the body comprising at least one channel through which a high temperature fluid flows, wherein heat is transmitted to the body as a result of contact with the high temperature fluid, the body further comprising a plurality of passageways therethrough, each passageway having a countersink provided in the body at each end thereof;

a non-conductive housing partially surrounding the body, the housing having an interior surface and an exterior surface, the interior surface facing the body, the interior surface of the non-conductive housing comprises a plurality of fastener receiving extensions extending therefrom toward the body, each fastener receiving extension having an aperture provided therethrough;

wherein respective apertures and respective passageways align with each other such that the fastener receiving extensions seat within the countersinks, the fastener receiving extensions being smaller than the countersinks such that the fastener receiving extensions do not contact the body; and the interior surface of the non-conductive housing having a plurality of spaced apart standoffs extending therefrom, the standoffs contacting the body, such that an air gap is formed between the interior surface of the non-conductive housing and the body at locations where standoffs of the non-conductive housing are not provided;

wherein the housing and body form a handle of the tool which in use is configured to have a user's hand contact a portion of the exterior surface of the housing such that the user's hand is adjacent to the body, the channel and at least a portion of the standoffs.

19. The hydraulically driven tool as defined in claim 18, further including a plurality of fasteners, respective fasteners extending through the aligned apertures and passageways.

20. A hydraulically driven tool comprising:

a body formed of a heat transmissive material, the body having at least one channel through which a high temperature fluid flows, wherein heat is transmitted to the body as a result of contact with the high temperature fluid, the body defining a perimeter;

a housing having an interior surface and an exterior surface, the interior surface facing the body, the interior surface defining a cavity in which the body is seated and which extends around the perimeter of the body; and the interior surface of the housing having a plurality of spaced apart standoffs extending therefrom, the standoffs contacting the body, such that an air gap is formed between the interior surface of the housing and the body at locations where standoffs of the housing are not provided;

wherein the housing and body form a handle of the tool which in use is configured to have a user's hand contact a portion of the exterior surface of the housing such that the user's hand is adjacent to the body, the channel and at least a portion of the standoffs wherein the interior surface of the housing comprises an aligned pair of fastener receiving extensions extending therefrom toward the body, each fastener receiving extension having an aperture provided therethrough; wherein the body includes a passageway therethrough, the passageway having a countersink provided in the body at each end thereof, wherein the passageway aligns with the aligned pair of fastener receiving extensions such that the fastener receiving extensions seat within the countersinks.

21. The hydraulically driven tool as defined in claim 20, wherein the interior surface of the housing comprises an aligned pair of fastener receiving extensions extending therefrom toward the body, each fastener receiving extension having an aperture provided therethrough.

22. The hydraulically driven tool as defined in claim 21, wherein the body includes a passageway therethrough, the passageway having a countersink provided in the body at each end thereof, wherein the passageway aligns with the aligned pair of fastener receiving extensions such that the fastener receiving extensions seat within the countersinks.

23. The hydraulically driven tool as defined in claim 22, wherein at least one of the fastener receiving extensions is smaller than the countersinks such that the at least one of the fastener receiving extensions does not contact the body.

24. The hydraulically driven tool as defined in claim 22, further including a fastener extending through the aligned apertures and passageway.

25. The hydraulically driven tool as defined in claim 20, wherein at least a portion of the housing is formed by injection molding.

26. The hydraulically driven tool as defined in claim 20, wherein the housing is formed in two parts.

27. The hydraulically driven tool as defined in claim 20, further including a gripping surface on the housing.

28. A hydraulically driven tool comprising:

a body formed of a heat transmissive material, the body having at least one channel through which a high temperature fluid flows wherein heat is transmitted to the body as a result of contact with the high temperature fluid, the body including a passageway therethrough, the passageway having a countersink provided in the body at each end thereof;

a housing partially surrounding the body, the housing having an interior surface and an exterior surface, the interior surface facing the body;

the interior surface of the housing having a plurality of spaced apart standoffs extending therefrom, the standoffs contacting the body, such that an air gap is formed between the interior surface and the body at locations where standoffs are not provided;

the interior surface of the housing having a pair of fastener receiving extensions extending therefrom toward the body, each fastener receiving extension having an aperture provided therethrough, wherein the apertures and the passageway align with each other such that the fastener receiving extensions seat within the countersinks; and a fastener extending through the apertures and the passageway;

wherein the housing and body form a handle of the tool which in use is configured to have a user's hand contact a portion of the exterior surface of the housing such that the user's hand is adjacent to the body, the channel and at least a portion of the standoffs.

29. The hydraulically driven tool as defined in claim 28, wherein at least one of the fastener receiving extensions is smaller than the countersinks such that the at least one of the fastener receiving extensions does not contact the body.

30. The hydraulically driven tool as defined in claim 28, wherein the standoffs are cross-shaped.

31. The hydraulically driven tool as defined in claim 28, wherein the housing is non-conductive.

* * * * *